US012744910B2

(12) United States Patent
Heo et al.

(10) Patent No.: US 12,744,910 B2
(45) Date of Patent: Sep. 22, 2026

(54) METHOD AND APPARATUS FOR ENCODING/DECODING IMAGE AND RECORDING MEDIUM FOR STORING BITSTREAM

(71) Applicants: HYUNDAI MOTOR COMPANY, Seoul (KR); KIA CORPORATION, Seoul (KR)

(72) Inventors: Jin Heo, Hwaseong-si (KR); Seung Wook Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/843,196

(22) PCT Filed: Mar. 6, 2023

(86) PCT No.: PCT/KR2023/003020

§ 371 (c)(1),
(2) Date: Aug. 30, 2024

(87) PCT Pub. No.: WO2023/172002

PCT Pub. Date: Sep. 14, 2023

(65) Prior Publication Data

US 2025/0184496 A1 Jun. 5, 2025

(30) Foreign Application Priority Data

Mar. 11, 2022 (KR) ........................ 10-2022-0030592
Mar. 6, 2023 (KR) ........................ 10-2023-0028852

(51) Int. Cl.
*H04N 19/109* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11)

(58) Field of Classification Search
CPC ... H04N 19/137; H04N 19/105; H04N 19/176
See application file for complete search history.

(56) References Cited

U.S. PATENT DOCUMENTS 9,532,042 B2 12/2016 Kim
9,854,248 B2 12/2017 Kim
(Continued)

FOREIGN PATENT DOCUMENTS

KR 20190095348 A 8/2019
KR 20200027487 A 3/2020
(Continued)

OTHER PUBLICATIONS

International Search Report cited in corresponding international application No. PCT/KR2023/003020; May 30, 2023; 12 pp.
(Continued)

*Primary Examiner* — Philip P. Dang
(74) *Attorney, Agent, or Firm* — Lempia Summerfield Katz LLC

(57) ABSTRACT

Provided is a video decoding method comprising determining a first base motion vector of a current block for a first reference picture and a second base motion vector of the current block for a second reference picture, determining a first refinement motion vector by refining the first base motion vector by a first motion vector difference and determining a second refinement motion vector by refining the second base motion vector by a second motion vector difference, determining first and second prediction blocks of the current block based on the first refinement motion vector and the second refinement motion vector, and determining a final prediction block for the current block based on a
(Continued)

weighted sum of the first prediction block and the second prediction block.

11 Claims, 9 Drawing Sheets

(51) Int. Cl.
*H04N 19/137* (2014.01)
*H04N 19/176* (2014.01)

(56) References Cited

U.S. PATENT DOCUMENTS 10,085,031 B2 9/2018 Kim
10,536,704 B2 1/2020 Kim
10,917,645 B2 2/2021 Kim
10,986,348 B2 4/2021 Kim
11,025,944 B2 * 6/2021 Lee .................... H04N 19/51
11,051,033 B2 6/2021 Alshin
11,115,671 B2 * 9/2021 Kuo .................... H04N 19/186
11,128,884 B2 * 9/2021 Liu .................... H04N 19/46
11,259,016 B2 * 2/2022 Li .................... H04N 19/176
11,284,069 B2 * 3/2022 Liu .................... H04N 19/147
11,310,508 B2 * 4/2022 Liu .................... H04N 19/46
11,405,607 B2 * 8/2022 Liu .................... H04N 19/105
11,412,231 B2 8/2022 Kim
11,418,811 B2 * 8/2022 Lee .................... H04N 19/147
11,457,238 B2 * 9/2022 Lim .................... H04N 19/105
11,483,550 B2 * 10/2022 Liu .................... H04N 19/159
11,509,927 B2 * 11/2022 Liu .................... H04N 19/105
11,528,508 B2 * 12/2022 Wang .................... H04N 19/426
11,546,590 B2 * 1/2023 Sun .................... H04N 19/186
11,546,591 B2 * 1/2023 Li .................... H04N 19/117
11,570,436 B2 * 1/2023 Lee .................... H04N 19/119
11,575,925 B2 * 2/2023 Lee .................... H04N 19/52
11,582,476 B2 2/2023 Alshin
11,616,976 B2 * 3/2023 Lim .................... H04N 19/523
375/240.03
11,671,616 B2 * 6/2023 Zhang .................... H04N 19/513
375/240.12
11,758,125 B2 * 9/2023 Park .................... H04N 19/563
375/240.02
11,825,126 B2 * 11/2023 Li .................... H04N 19/82
11,877,010 B2 * 1/2024 Jang .................... H04N 19/70
11,909,960 B2 * 2/2024 Jang .................... H04N 19/107
11,930,165 B2 * 3/2024 Zhang .................... H04N 19/109
11,936,899 B2 * 3/2024 Zhang .................... H04N 19/513
11,956,465 B2 * 4/2024 Liu .................... H04N 19/109
12,010,305 B2 * 6/2024 Lee .................... H04N 19/105
12,010,347 B2 * 6/2024 Kuo .................... H04N 19/13
12,058,336 B2 * 8/2024 Jang .................... H04N 19/137
12,075,085 B2 8/2024 Chen
12,200,270 B2 * 1/2025 Li .................... H04N 19/12
12,219,166 B2 * 2/2025 Zhang .................... H04N 19/176
12,256,062 B2 * 3/2025 Lim .................... H04N 19/56
12,262,004 B2 * 3/2025 Kuo .................... H04N 19/176
12,262,046 B2 * 3/2025 Hendry .................... H04N 19/52
2014/0140409 A1 5/2014 Kim
2017/0048529 A1 2/2017 Kim
2017/0048530 A1 2/2017 Kim
2018/0070092 A1 3/2018 Kim
2018/0242004 A1 * 8/2018 Park .................... H04N 19/52
2018/0359478 A1 12/2018 Kim
2020/0029090 A1 1/2020 Alshin
2020/0099937 A1 3/2020 Kim
2021/0006824 A1 * 1/2021 Jeong .................... H04N 19/176
2021/0203954 A1 7/2021 Kim
2021/0281872 A1 9/2021 Alshin
2021/0344909 A1 * 11/2021 Liu .................... H04N 19/105
2022/0014775 A1 * 1/2022 Lee .................... H04N 19/176
2022/0038732 A1 * 2/2022 Jang .................... H04N 19/52
2022/0038734 A1 * 2/2022 Lee .................... H04N 19/176
2022/0232242 A1 7/2022 Chen
2022/0239918 A1 * 7/2022 Jang .................... H04N 19/132
2023/0156216 A1 5/2023 Alshin

FOREIGN PATENT DOCUMENTS

KR 20210153548 A 12/2021
KR 20220003027 A 1/2022

OTHER PUBLICATIONS

Zhuoyi Lv et al., Non-EE2: Template Matching-based OBMC Design, Joint Video Experts Team (JVET) of ITU-T SG 16 WP 3 and ISO/IEC JTC 1/SC 29; 25th Meeting, by teleconference, Jan. 12-21, 2022, 7pp.

* cited by examiner

METHOD AND APPARATUS FOR ENCODING/DECODING IMAGE AND RECORDING MEDIUM FOR STORING BITSTREAM

CROSS-REFERENCE TO RELATED APPLICATION

This application is a U.S. national stage of International Application No. PCT/KR2023/003020, filed on Mar. 6, 2023, which claims priority to Korean Patent Application No. 10-2022-0030592, filed on Mar. 11, 2022, and Korean Patent Application No. 10-2023-0028852, filed on Mar. 6, 2023, the entire contents of each of which are hereby incorporated herein by reference.

TECHNICAL FIELD

The present invention relates to an image encoding/decoding method and apparatus and a recording medium for storing a bitstream. More particularly, the present invention relates to an image encoding/decoding method and apparatus using a decoder side motion vector refinement (DMVR) method and a recording medium for storing a bitstream.

BACKGROUND

Recently, the demand for high-resolution, high-quality images such as ultra-high definition (UHD) images is increasing in various application fields. As image data becomes higher in resolution and quality, the amount of data increases relatively compared to existing image data. Therefore, when transmitting image data using media such as existing wired and wireless broadband lines or storing image data using existing storage media, the transmission and storage costs increase. In order to solve these problems that occur as image data becomes higher in resolution and quality, high-efficiency image encoding/decoding technology for images with higher resolution and quality is required.

In merge mode among inter prediction modes, motion information such as motion vectors and reference picture information from neighboring blocks of a current block may be used to predict the current block. If bidirectional inter prediction referring to two reference pictures is applied in merge mode, decoder side motion vector refinement (DMVR) may be applied. Through the decoder side motion vector refinement, the motion vectors obtained from neighboring blocks are refined even in merge mode, thereby improving the prediction accuracy of the current block.

SUMMARY

An object of the present invention is to provide an image encoding/decoding method and apparatus with improved encoding/decoding efficiency.

Another object of the present invention is to provide a recording medium for storing a bitstream generated by an image decoding method or apparatus according to an embodiment of the present invention.

A video decoding method according to an embodiment of the present invention may comprise determining a first base motion vector of a current block for a first reference picture and a second base motion vector of the current block for a second reference picture, determining a first refinement motion vector by refining the first base motion vector by a first motion vector difference and determining a second refinement motion vector by refining the second base motion vector by a second motion vector difference, determining first and second prediction blocks of the current block based on the first refinement motion vector and the second refinement motion vector, and determining a final prediction block for the current block based on a weighted sum of the first prediction block and the second prediction block.

According to an embodiment, determining the first refinement motion vector and the second refinement motion vector includes determining the first refinement motion vector and the second refinement motion vector when a distance between a current picture including the current block and the first reference picture and a distance between the current picture and the second reference picture are different.

According to an embodiment, the weighted sum of the first prediction block and the second prediction block may be determined by a weight determined according to the distance between the current picture and the first reference picture and the distance between the current picture and the second reference picture.

According to an embodiment, a first weight applied to the first prediction block may be proportional to the distance between the current picture and the second reference picture and a second weight applied to the second prediction block may be proportional to the distance between the current picture and the first reference picture.

According to an embodiment, in the determining of the first refinement motion vector and the second refinement motion vector, a ratio of a magnitude of the first motion vector difference and a magnitude of the second motion vector difference may be proportional to a ratio of the distance between the current picture and the first reference picture and the distance between the current picture and the second reference picture.

According to an embodiment, the magnitudes of the first motion vector difference and the second motion vector difference may be limited within a predetermined range.

According to an embodiment, the first refinement motion vector and the second refinement motion vector may be determined so that distortion between the first prediction block indicated by the first refinement motion vector and the second prediction block indicated by the second refinement motion vector is minimized.

According to an embodiment, the first refinement motion vector and the second refinement motion vector may be determined so that distortion between a first template of the first prediction block indicated by the first refinement motion vector, a second template of the second prediction block indicated by the second refinement motion vector, and a current template of the current block is minimized.

According to an embodiment, the distortion may be calculated based on the final template determined by a weighted average of the first template and the second template and the current template.

According to an embodiment, in the weighted average of the first template and the second template, a first weight applied to the first template may be proportional to the distance between the current picture and the second reference picture and a second weight applied to the second template may be proportional to the distance between the current picture and the first reference picture.

According to an embodiment, a first weight applied to the first template may be proportional to distortion of the second template and the current template and a second weight applied to the second template may be proportional to distortion of the first template and the current template.

According to an embodiment, the weighted sum of the first prediction block and the second prediction block may be determined by a weight determined based on a picture type of a current picture including the current block.

According to an embodiment, the weighted sum of the first prediction block and the second prediction block may be determined by a weight determined based on weight information generated by parsing a bitstream.

A video encoding method according to an embodiment of the present invention may comprise determining a first base motion vector of a current block for a first reference picture and a second base motion vector of the current block for a second reference picture, determining a first refinement motion vector by refining the first base motion vector by a first motion vector difference and determining a second refinement motion vector by refining the second base motion vector by a second motion vector difference, determining first and second prediction blocks of the current block based on the first refinement motion vector and the second refinement motion vector, and determining a final prediction block for the current block based on a weighted sum of the first prediction block and the second prediction block.

A non-transitory computer-readable recording medium according to an embodiment of the present invention may store a bitstream generated by the video encoding method.

A transmission method according to an embodiment of the present invention transmits a bitstream generated by the video encoding method.

The features briefly summarized above with respect to the present disclosure are merely exemplary aspects of the detailed description below of the present disclosure, and do not limit the scope of the present disclosure.

Embodiments of the present disclosure provide a method of improving a decoder side motion vector refinement (DMVR).

According to embodiments of the present disclosure, the application frequency of the decoder side motion vector refinement method can be increased by changing the application conditions of the decoder side motion vector refinement method.

In addition, in the decoder side motion vector refinement method, a method of applying different weights to bidirectional motion vectors instead of applying the same weight is disclosed.

In addition, in the decoder side motion vector refinement method, a method of refining motion vectors based on a template matching method instead of bilateral matching is disclosed.

By using the disclosed methods, the accuracy of the decoder side motion vector refinement method may be improved, and the accuracy of a final prediction block may be increased, thereby improving encoding efficiency.

DETAILED DESCRIPTION

Figure 1:
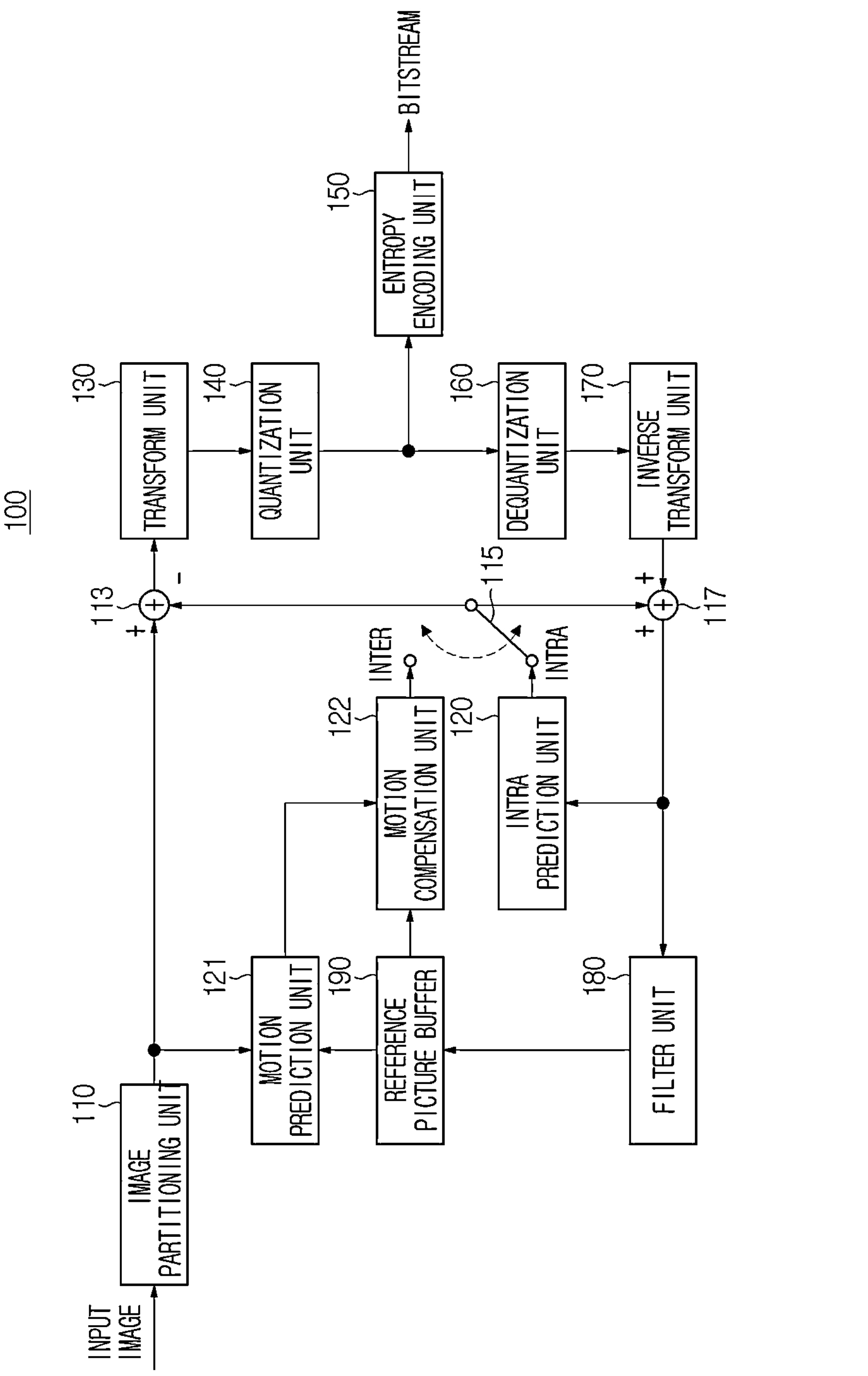
FIG. 1 is a block diagram showing a configuration of an encoding apparatus according to an embodiment of the present invention.

A video decoding method according to an embodiment of the present invention may comprise determining a first base motion vector of a current block for a first reference picture and a second base motion vector of the current block for a second reference picture, determining a first refinement motion vector by refining the first base motion vector by a first motion vector difference and determining a second refinement motion vector by refining the second base motion vector by a second motion vector difference, determining first and second prediction blocks of the current block based on the first refinement motion vector and the second refinement motion vector, and determining a final prediction block for the current block based on a weighted sum of the first prediction block and the second prediction block.

The present invention may have various modifications and embodiments, and specific embodiments are illustrated in the drawings and described in detail in the detailed description. However, this is not intended to limit the present invention to specific embodiments, but should be understood to include all modifications, equivalents, or substitutes included in the spirit and technical scope of the present invention. Similar reference numerals in the drawings indicate the same or similar functions throughout various aspects. The shapes and sizes of elements in the drawings may be provided by way of example for a clearer description. The detailed description of the exemplary embodiments described below refers to the accompanying drawings, which illustrate specific embodiments by way of example. These embodiments are described in sufficient detail to enable those skilled in the art to practice the embodiments. It should be understood that the various embodiments are different from each other, but are not necessarily mutually exclusive. For example, specific shapes, structures, and characteristics described herein may be implemented in other embodiments without departing from the spirit and scope of the present invention with respect to one embodiment. It should also be understood that the positions or arrangements of individual components within each disclosed embodiment may be changed without departing from the spirit and scope of the embodiment. Accordingly, the detailed description set forth below is not intended to be limiting, and the scope of the exemplary embodiments is defined only by the appended claims, along with the full scope of equivalents to which such claims are entitled, if properly described.

In the present invention, the terms first, second, etc. may be used to describe various components, but the components should not be limited by the terms. The terms are only used for the purpose of distinguishing one component from another. For example, without departing from the scope of the present invention, the first component may be referred to as the second component, and similarly, the second component may also be referred to as the first component. The term and/or includes a combination of a plurality of related described items or any item among a plurality of related described items.

The components shown in the embodiments of the present invention are independently depicted to indicate different characteristic functions, and do not mean that each component is formed as a separate hardware or software configuration unit. That is, each component is listed and included as a separate component for convenience of explanation, and at least two of the components may be combined to form a single component, or one component may be divided into multiple components to perform a function, and embodiments in which components are integrated and embodiments in which each component is divided are also included in the scope of the present invention as long as they do not deviate from the essence of the present invention.

The terminology used in the present invention is only used to describe specific embodiments and is not intended to limit the present invention. The singular expression includes the plural expression unless the context clearly indicates otherwise. In addition, some components of the present invention are not essential components that perform essential functions in the present invention and may be optional components only for improving performance. The present invention may be implemented by including only essential components for implementing the essence of the present invention excluding components only used for improving performance, and a structure including only essential components excluding optional components only used for improving performance is also included in the scope of the present invention.

In an embodiment, the term "at least one" may mean one of a number greater than or equal to 1, such as 1, 2, 3, and 4. In an embodiment, the term "a plurality of" may mean one of a number greater than or equal to 2, such as 2, 3, and 4.

Hereinafter, embodiments of the present invention will be specifically described with reference to the drawings. In describing the embodiments of this specification, if it is determined that a detailed description of a related known configuration or function may obscure the subject matter of this specification, the detailed description will be omitted, and the same reference numerals will be used for the same components in the drawings, and repeated descriptions of the same components will be omitted.

DESCRIPTION OF TERMS

Hereinafter, "image" may mean one picture constituting a video, and may also refer to the video itself. For example, "encoding and/or decoding of an image" may mean "encoding and/or decoding of a video," and may also mean "encoding and/or decoding of one of images constituting the video."

Hereinafter, "moving image" and "video" may be used with the same meaning and may be used interchangeably. In addition, a target image may be an encoding target image that is a target of encoding and/or a decoding target image that is a target of decoding. In addition, the target image may be an input image input to an encoding apparatus and may be an input image input to a decoding apparatus. Here, the target image may have the same meaning as a current image.

Hereinafter, "image", "picture", "frame" and "screen" may be used with the same meaning and may be used interchangeably.

Hereinafter, a "target block" may be an encoding target block that is a target of encoding and/or a decoding target block that is a target of decoding. In addition, the target block may be a current block that is a target of current encoding and/or decoding. For example, "target block" and "current block" may be used with the same meaning and may be used interchangeably.

Hereinafter, "block" and "unit" may be used with the same meaning and may be used interchangeably. In addition, "unit" may mean including a luma component block and a chroma component block corresponding thereto in order to distinguish it from a block. For example, a coding tree unit (CTU) may be composed of one luma component (Y) coding tree block (CTB) and two chroma component (Cb, Cr) coding tree blocks related to it.

Hereinafter, "sample", "picture element" and "pixel" may be used with the same meaning and may be used interchangeably. Herein, a sample may represent a basic unit that constitutes a block.

Hereinafter, "inter" and "inter-screen" may be used with the same meaning and can be used interchangeably.

Hereinafter, "intra" and "in-screen" may be used with the same meaning and can be used interchangeably.

FIG. 1 is a block diagram showing a configuration of an encoding apparatus according to an embodiment of the present invention.

The encoding apparatus 100 may be an encoder, a video encoding apparatus, or an image encoding apparatus. A video may include one or more images. The encoding apparatus 100 may sequentially encode one or more images.

Referring to FIG. 1, the encoding apparatus 100 may include an image partitioning unit 110, an intra prediction unit 120, a motion prediction unit 121, a motion compensation unit 122, a switch 115, a subtractor 125, a transform unit 130, a quantization unit 140, an entropy encoding unit 150, a dequantization unit 160, an inverse transform unit 170, an adder 117, a filter unit 180 and a reference picture buffer 190.

In addition, the encoding apparatus 100 may generate a bitstream including information encoded through encoding of an input image, and output the generated bitstream. The generated bitstream may be stored in a computer-readable recording medium, or may be streamed through a wired/wireless transmission medium.

The image partitioning unit 110 may partition the input image into various forms to increase the efficiency of video encoding/decoding. Accordingly, the input video may be composed of multiple pictures, and one picture may be hierarchically partitioned and processed for compression efficiency, parallel processing, etc. For example, one picture may be partitioned into one or multiple tiles or slices, and then partitioned again into multiple CTUs (Coding Tree Units). Alternatively, one picture may first be partitioned into multiple sub-pictures defined as groups of rectangular slices, and each sub-picture may be partitioned into the tiles/slices. Here, the sub-picture may be utilized to support the function of partially independently encoding/decoding and transmitting the picture. Since multiple sub-pictures may be individually reconstructed, this has the advantage of easy editing in applications that configure multi-channel inputs into one picture. In addition, a tile may be divided horizontally to generate bricks. Here, the brick may be utilized as the basic unit of parallel processing within the picture. In addition, one CTU may be recursively partitioned into quad trees (QTs), and the terminal node of the partition may be defined as a CU (Coding Unit). The CU may be partitioned into a PU (Prediction Unit), which is a prediction unit, and a TU (Transform Unit), which is a transform unit, to perform prediction and partition. Meanwhile, the CU may be utilized as the prediction unit and/or the transform unit itself. Here, for flexible partition, each CTU may be recursively partitioned into multi-type trees (MTTs) as well as quad trees (QTs). The partition of the CTU into multi-type trees may start from the terminal node of the QT, and the MTT may be composed of a binary tree (BT) and a triple tree (TT). For example, the MTT structure may be classified into a vertical binary split mode (SPLIT_BT_VER), a horizontal binary split mode (SPLIT_BT_HOR), a vertical ternary split mode (SPLIT_TT_VER), and a horizontal ternary split mode (SPLIT_TT_HOR). In addition, a minimum block size (MinQTSize) of the quad tree of the luma block during partition may be set to 16×16, a maximum block size (MaxBtSize) of the binary tree may be set to 128×128, and a maximum block size (MaxTtSize) of the triple tree may be set to 64×64. In addition, a minimum block size (MinBtSize) of the binary tree and a minimum block size (MinTtSize) of the triple tree may be specified as 4×4, and the maximum depth (MaxMttDepth) of the multi-type tree may be specified as 4. In addition, in order to increase the encoding efficiency of the I slice, a dual tree that differently uses CTU partition structures of luma and chroma components may be applied. On the other hand, in P and B slices, the luma and chroma CTBs (Coding Tree Blocks) within the CTU may be partitioned into a single tree that shares the coding tree structure.

The encoding apparatus 100 may perform encoding on the input image in the intra mode and/or the inter mode. Alternatively, the encoding apparatus 100 may perform encoding on the input image in a third mode (e.g., IBC mode, Palette mode, etc.) other than the intra mode and the inter mode. However, if the third mode has functional characteristics similar to the intra mode or the inter mode, it may be classified as the intra mode or the inter mode for convenience of explanation. In the present invention, the third mode is classified and described separately only when a specific description thereof is required.

When the intra mode is used as the prediction mode, the switch 115 may be switched to intra, and when the inter mode is used as the prediction mode, the switch 115 may be switched to inter. Here, the intra mode may mean an intra prediction mode, and the inter mode may mean an inter prediction mode. The encoding apparatus 100 may generate a prediction block for an input block of the input image. In addition, the encoding apparatus 100 may encode a residual block using a residual of the input block and the prediction block after the prediction block is generated. The input image may be referred to as a current image which is a current encoding target. The input block may be referred to as a current block which is a current encoding target or an encoding target block.

When a prediction mode is an intra mode, the intra prediction unit 120 may use a sample of a block that has been already encoded/decoded around a current block as a reference sample. The intra prediction unit 120 may perform spatial prediction for the current block by using the reference sample, or generate prediction samples of an input block through spatial prediction. Herein, the intra prediction may mean intra prediction.

As an intra prediction method, non-directional prediction modes such as DC mode and Planar mode and directional prediction modes (e.g., 65 directions) may be applied. Here, the intra prediction method may be expressed as an intra prediction mode or an intra prediction mode.

When a prediction mode is an inter mode, the motion prediction unit 111 may retrieve a region that best matches with an input block from a reference image in a motion prediction process, and derive a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block of the current block by performing motion compensation using a motion vector. Herein, inter prediction may mean inter prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation, it may be determined whether the motion prediction and motion compensation mode of the prediction unit included in the coding unit is one of a skip mode, a merge mode, an advanced motion vector prediction (AMVP) mode, and an intra block copy (IBC) mode based on the coding unit and inter prediction or motion compensation may be performed according to each mode.

In addition, based on the above inter prediction method, an AFFINE mode of sub-PU based prediction, an SbTMVP (Subblock-based Temporal Motion Vector Prediction) mode, an MMVD (Merge with MVD) mode of PU-based prediction, and a GPM (Geometric Partitioning Mode) mode may be applied. In addition, in order to improve the performance of each mode, HMVP (History based MVP), PAMVP (Pairwise Average MVP), CIIP (Combined Intra/Inter Prediction), AMVR (Adaptive Motion Vector Resolution), BDOF (Bi-Directional Optical-Flow), BCW (Bi-predictive with CU Weights), LIC (Local Illumination Compensation), TM (Template Matching), OBMC (Overlapped Block Motion Compensation), etc. may be applied.

Among these, the AFFINE mode is a technology that is used in both AMVP and MERGE modes and also has high encoding efficiency. In the existing video coding standard, since MC (Motion Compensation) is performed by considering only the parallel movement of blocks, it has a disadvantage in that it cannot properly compensate for motions that occur in reality, such as zoom-in/out and rotation. To supplement this, a four-parameter affine motion model using two control point motion vectors (CPMVs) and a six-parameter affine motion model using three control point motion vectors may be used and applied to inter prediction. Here, CPMV is a vector representing the affine motion model of one of the upper left, upper right, and lower left of the current block. The AFFINE mode is divided into AMVP or MERGE mode for CPMV encoding. Meanwhile, considering the video coding computational complexity, affine motion compensation may be performed in 4×4 block units without performing pixel-wise affine motion compensation. That is, when viewed in 4×4 block units, it is the same as the existing motion compensation, but from the perspective of the entire PU, it may be seen as affine motion compensation.

The subtractor 113 may generate a residual block by using a difference between an input block and a prediction block. The residual block may be called a residual signal. The residual signal may mean a difference between an original signal and a prediction signal. Alternatively, the residual signal may be a signal generated by transforming or quantizing, or transforming and quantizing a difference between the original signal and the prediction signal. The residual block may be a residual signal of a block unit.

The transform unit 130 may generate a transform coefficient by performing transform on a residual block, and output the generated transform coefficient. Herein, the transform coefficient may be a coefficient value generated by performing transform on the residual block. When a transform skip mode is applied, the transform unit 130 may skip transform of the residual block.

A quantized level may be generated by applying quantization to the transform coefficient or to the residual signal. Hereinafter, the quantized level may also be called a transform coefficient in embodiments.

For example, a 4×4 luma residual block generated through intra prediction is transformed using a base vector based on DST (Discrete Sine Transform), and transform may be performed on the remaining residual block using a base vector based on DCT (Discrete Cosine Transform). In addition, a transform block is partitioned into a quad tree shape for one block using RQT (Residual Quad Tree) technology, and after performing transform and quantization on each transformed block partitioned through RQT, a coded block flag (cbf) may be transmitted to increase encoding efficiency when all coefficients become 0.

As another alternative, the Multiple Transform Selection (MTS) technique, which selectively uses multiple transform bases to perform transform, may be applied. In this case, instead of partitioning a CU into TUs through RQT, a function similar to TU partition may be performed through the sub-block Transform (SBT) technique. As an example, SBT is applied only to inter prediction blocks, and unlike RQT, the current block may be partitioned into ½ or 14 sizes in the vertical or horizontal direction and then transform may be performed on only one of the blocks. For example, if it is partitioned vertically, transform may be performed on the leftmost or rightmost block, and if it is partitioned horizontally, transform may be performed on the topmost or bottommost block.

In addition, LFNST (LOW Frequency Non-Separable Transform), a secondary transform technique that additionally transforms the residual signal transformed into the frequency domain through DCT or DST, may be applied. LFNST additionally performs transform on the low-frequency region of 4×4 or 8×8 in the upper left, so that the residual coefficients may be concentrated in the upper left.

The quantization unit 140 may generate a quantized level by quantizing the transform coefficient or the residual signal according to a quantization parameter (QP), and output the generated quantized level. Herein, the quantization unit 140 may quantize the transform coefficient by using a quantization matrix.

For example, a quantizer using QP values of 0 to 51 may be used. Alternatively, if the image size is larger and high encoding efficiency is required, the QP of 0 to 63 may be used. Also, a DQ (Dependent Quantization) method using two quantizers instead of one quantizer may be applied. DQ performs quantization using two quantizers (e.g., Q0 and Q1), but even without signaling information about the use of a specific quantizer, the quantizer to be used for the next transform coefficient may be selected based on the current state through a state transition model.

The entropy encoding unit 150 may generate a bitstream by performing entropy encoding according to a probability distribution on values calculated by the quantization unit 140 or on coding parameter values calculated when performing encoding, and may output the bitstream. The entropy encoding unit 150 may perform entropy encoding of information on a sample of an image and information for decoding an image. For example, the information for decoding the image may include a syntax element.

When entropy encoding is applied, symbols are represented so that a smaller number of bits are assigned to a symbol having a high occurrence probability and a larger number of bits are assigned to a symbol having a low occurrence probability, and thus, the size of bit stream for symbols to be encoded may be decreased. The entropy encoding unit 150 may use an encoding method, such as exponential Golomb, context-adaptive variable length coding (CAVLC), context-adaptive binary arithmetic coding (CABAC), etc., for entropy encoding. For example, the entropy encoding unit 150 may perform entropy encoding by using a variable length coding/code (VLC) table. In addition, the entropy encoding unit 150 may derive a binarization method of a target symbol and a probability model of a target symbol/bin, and perform arithmetic coding by using the derived binarization method, and a context model.

In relation to this, when applying CABAC, in order to reduce the size of the probability table stored in the decoding apparatus, a table probability update method may be changed to a table update method using a simple equation and applied. In addition, two different probability models may be used to obtain more accurate symbol probability values.

In order to encode a transform coefficient level (quantized level), the entropy encoding unit 150 may change a two-dimensional block form coefficient into a one-dimensional vector form through a transform coefficient scanning method.

A coding parameter may include information (flag, index, etc.) encoded in the encoding apparatus 100 and signaled to the decoding apparatus 200, such as syntax element, and information derived in the encoding or decoding process, and may mean information required when encoding or decoding an image.

Herein, signaling the flag or index may mean that a corresponding flag or index is entropy encoded and included in a bitstream in an encoder, and may mean that the corresponding flag or index is entropy decoded from a bitstream in a decoder.

The encoded current image may be used as a reference image for another image to be processed later. Therefore, the encoding apparatus 100 may reconstruct or decode the encoded current image again and store the reconstructed or decoded image as a reference image in the reference picture buffer 190.

A quantized level may be dequantized i the dequantization unit 160, or may be inversely transformed in the inverse transform unit 170. A dequantized and/or inversely transformed coefficient may be added with a prediction block through the adder 117. Herein, the dequantized and/or inversely transformed coefficient may mean a coefficient on which at least one of dequantization and inverse transform is performed, and may mean a reconstructed residual block. The dequantization unit 160 and the inverse transform unit 170 may be performed as an inverse process of the quantization unit 140 and the transform unit 130.

The reconstructed block may pass through the filter unit 180. The filter unit 180 may apply a deblocking filter, a sample adaptive offset (SAO), an adaptive loop filter (ALF), a bilateral filter (BIF), luma mapping with chroma scaling (LMCS), etc. to a reconstructed sample, a reconstructed block or a reconstructed image using all or some filtering techniques. The filter unit 180 may be called an in-loop filter. In this case, the in-loop filter is also used as name excluding LMCS.

The deblocking filter may remove block distortion generated in boundaries between blocks. In order to determine whether or not to apply a deblocking filter, whether or not to apply a deblocking filter to a current block may be determined based on samples included in several rows or columns which are included in the block. When a deblocking filter is applied to a block, a different filter may be applied according to a required deblocking filtering strength.

In order to compensate for encoding error using sample adaptive offset, a proper offset value may be added to a sample value. The sample adaptive offset may correct an offset of a deblocked image from an original image by a sample unit. A method of partitioning a sample included in an image into a predetermined number of regions, determining a region to which an offset is applied, and applying the offset to the determined region, or a method of applying an offset in consideration of edge information on each sample may be used.

A bilateral filter (BIF) may also correct the offset from the original image on a sample-by-sample basis for the image on which deblocking has been performed.

The adaptive loop filter may perform filtering based on a comparison result of the reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the adaptive loop filter to be applied to each block may vary.

In LMCS (Luma Mapping with Chroma Scaling), luma mapping (LM) means remapping luma values through a piece-wise linear model, and chroma scaling (CS) means a technique for scaling the residual value of the chroma component according to the average luma value of the prediction signal. In particular, LMCS may be utilized as an HDR correction technique that reflects the characteristics of HDR (High Dynamic Range) images.

The reconstructed block or the reconstructed image having passed through the filter unit 180 may be stored in the reference picture buffer 190. A reconstructed block that has passed through the filter unit 180 may be a part of a reference image. That is, the reference image is a reconstructed image composed of reconstructed blocks that have passed through the filter unit 180. The stored reference image may be used later in inter prediction or motion compensation.

Figure 2:
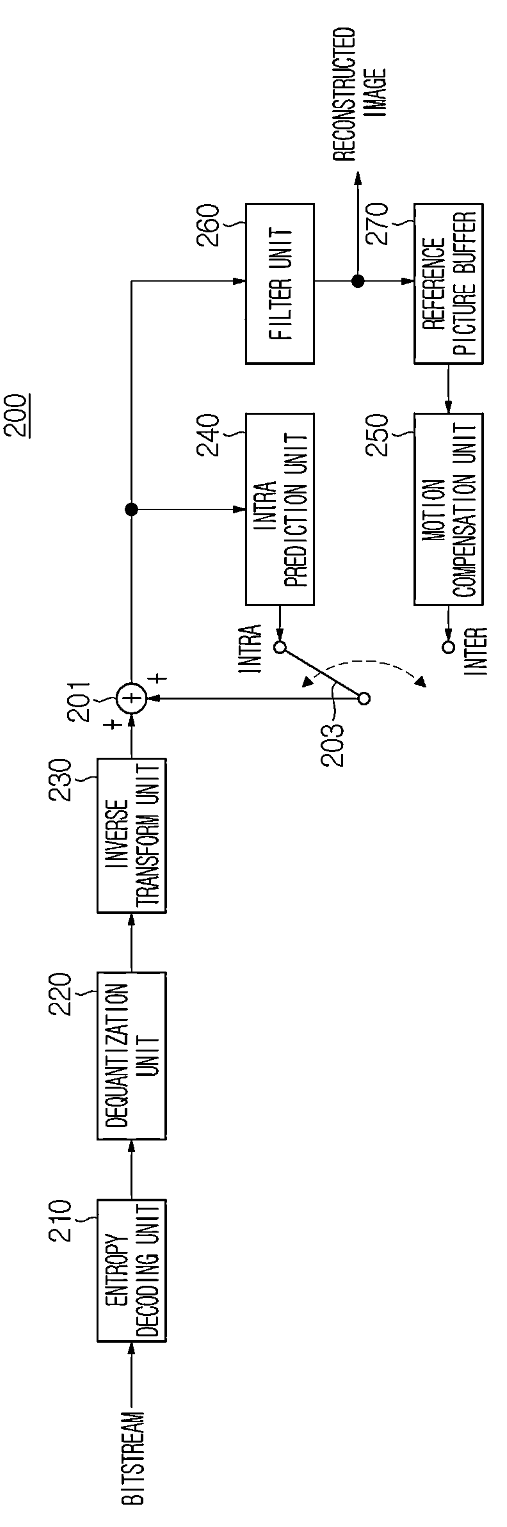
FIG. 2 is a block diagram showing a configuration of a decoding apparatus according to an embodiment of the present invention.

FIG. 2 is a block diagram showing a configuration of a decoding apparatus according to an embodiment of the present invention.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse transform unit 230, an intra prediction unit 240, a motion compensation unit 250, an adder 201, a switch 203, a filter unit 260, and a reference picture buffer 270.

The decoding apparatus 200 may receive a bitstream output from the encoding apparatus 100. The decoding apparatus 200 may receive a bitstream stored in a computer-readable recording medium, or may receive a bitstream that is streamed through a wired/wireless transmission medium. The decoding apparatus 200 may decode the bitstream in an intra mode or an inter mode. In addition, the decoding apparatus 200 may generate a reconstructed image generated through decoding or a decoded image, and output the reconstructed image or decoded image.

When a prediction mode used for decoding is an intra mode, the switch 20 may be switched to intra. Alternatively, when a prediction mode used for decoding is an inter mode, the switch 203 may be switched to inter.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block and the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse process of the entropy encoding method described above.

The entropy decoding unit 210 may change a one-dimensional vector-shaped coefficient into a two-dimensional block-shaped coefficient through a transform n coefficient scanning method to decode a transform coefficient level (quantized level).

A quantized level may be dequantized in the dequantization unit 220, or inversely transformed in the inverse transform unit 230. The quantized level may be a result of dequantization and/or inverse transform, and may be generated as a reconstructed residual block. Herein, the dequantization unit 220 may apply a quantization matrix to the quantized level. The dequantization unit 220 and the inverse transform unit 230 applied to the decoding apparatus may apply the same technology as the dequantization unit 160 and inverse transform unit 170 applied to the aforementioned encoding apparatus.

When an intra mode is used, the intra prediction unit 240 may generate a prediction block by performing, on the current block, spatial prediction that uses a sample value of a block which has been already decoded around a decoding target block. The intra prediction unit 240 applied to the decoding apparatus may apply the same technology as the intra prediction unit 120 applied to the aforementioned encoding apparatus.

When an inter mode is used, the motion compensation unit 250 may generate a prediction block by performing, on the current block, motion compensation that uses a motion vector and a reference image stored in the reference picture buffer 270. The motion compensation unit 250 may generate a prediction block by applying an interpolation filter to a partial region within a reference image when the value of the motion vector is not an integer value. In order to perform motion compensation, it may be determined whether the motion compensation method of the prediction unit included in the corresponding coding unit is a skip mode, a merge mode, an AMVP mode, or a current picture reference mode based on the coding unit, and motion compensation may be performed according to each mode. The motion compensation unit 250 applied to the decoding apparatus may apply the same technology as the motion compensation unit 122 applied to the encoding apparatus described above.

The adder 201 may generate a reconstructed block by adding the reconstructed residual block and the prediction block. The filter unit 260 may apply at least one of inverse-LMCS, a deblocking filter, a sample adaptive offset, and an adaptive loop filter to the reconstructed block or reconstructed image. The filter unit 260 applied to the decoding apparatus may apply the same filtering technology as that applied to the filter unit 180 applied to the aforementioned encoding apparatus.

The filter unit 260 may output the reconstructed image. The reconstructed block or reconstructed image may be stored in the reference picture buffer 270 and used for inter prediction. A reconstructed block that has passed through the filter unit 260 may be a part of a reference image. In other words, a reference image may be a reconstructed image composed of reconstructed blocks that have passed through the filter unit 260. The stored reference image may be used later in inter prediction or motion compensation.

Figure 3:
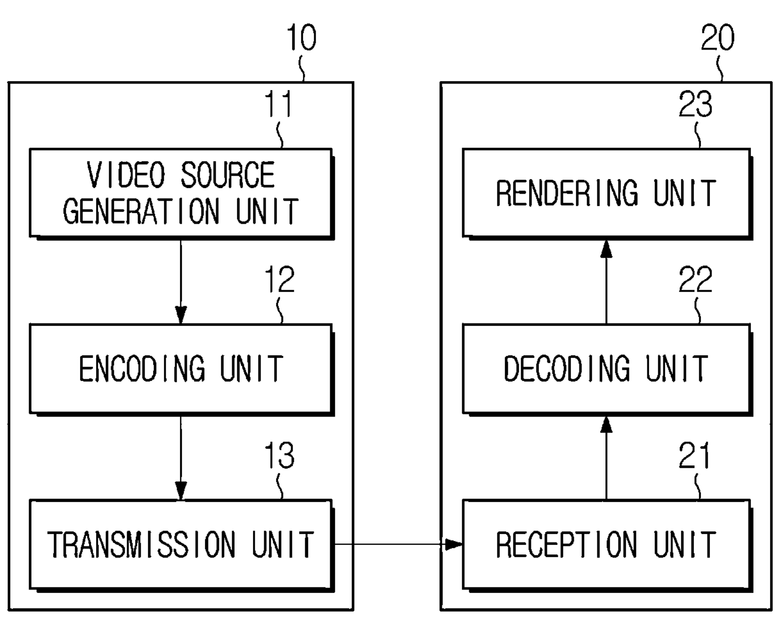
FIG. 3 is a diagram schematically showing a video coding system to which the present invention is applicable.

FIG. 3 is a diagram schematically showing a video coding system to which the present invention is applicable.

A video coding system according to an embodiment may include an encoding apparatus 10 and a decoding apparatus 20. The encoding apparatus 10 may transmit encoded video and/or image information or data to the decoding apparatus 20 in the form of a file or streaming through a digital storage medium or a network.

The encoding apparatus 10 according to an embodiment may include a video source generation unit 11, an encoding unit 12, a transmission unit 13. The decoding apparatus 20 according to an embodiment may include a reception unit 21, a decoding unit 22, and a rendering unit 23. The encoding unit 12 may be called a video/image encoding unit, and the decoding unit 22 may be called a video/image decoding unit. The transmission unit 13 may be included in the encoding unit 12. The reception unit 21 may be included in the decoding unit 22. The rendering unit 23 may include a display unit, and the display unit may be configured as a separate device or an external component.

The video source generation unit 11 may obtain the video/image through a process of capturing, synthesizing, or generating the video/image. The video source generation unit 11 may include a video/image capture device and/or a video/image generation device. The video/image capture device may include, for example, one or more cameras, video/image archive including previously captured video/image, etc. The video/image generation device may include, for example, a computer, a tablet, and a smartphone, etc., and may (electronically) generate the video/image. For example, a virtual video/image may be generated through a computer, etc., in which case the video/image capture process may be replaced with a process of generating related data.

The encoding unit 12 may encode the input video/image. The encoding unit 12 may perform a series of procedures such as prediction, transform, and quantization for compression and encoding efficiency. The encoding unit 12 may output encoded data (encoded video/image information) in the form of bitstream. The detailed configuration of the encoding unit 12 may also be configured in the same manner as the encoding apparatus 100 of FIG. 1 described above.

The transmission unit 13 may transmit encoded video/image information or data output in the form of a bitstream to the reception unit 21 of the decoding apparatus 20 through a digital storage medium or a network in the form of a file or streaming. The digital storage medium may include various storage media such as USB, SD, CD, DVD, Blu-ray, HDD, SSD, etc. The transmission unit 13 may include an element for generating a media file through a predetermined file format and may include an element for transmission through a broadcasting/communication network. The reception unit 21 may extract/receive the bitstream from the storage medium or the network and transmit it to the decoding unit 22.

The decoding unit 22 may decode the video/image by performing a series of procedures such as dequantization, inverse transform, and prediction corresponding to the operation of the encoding unit 12. The detailed configuration of the decoding unit 22 may also be configured in the same manner as the above-described decoding apparatus 200 of FIG. 2.

The rendering unit 23 may render the decoded video/image. The rendered video/image may be displayed through the display unit.

Figure 4:
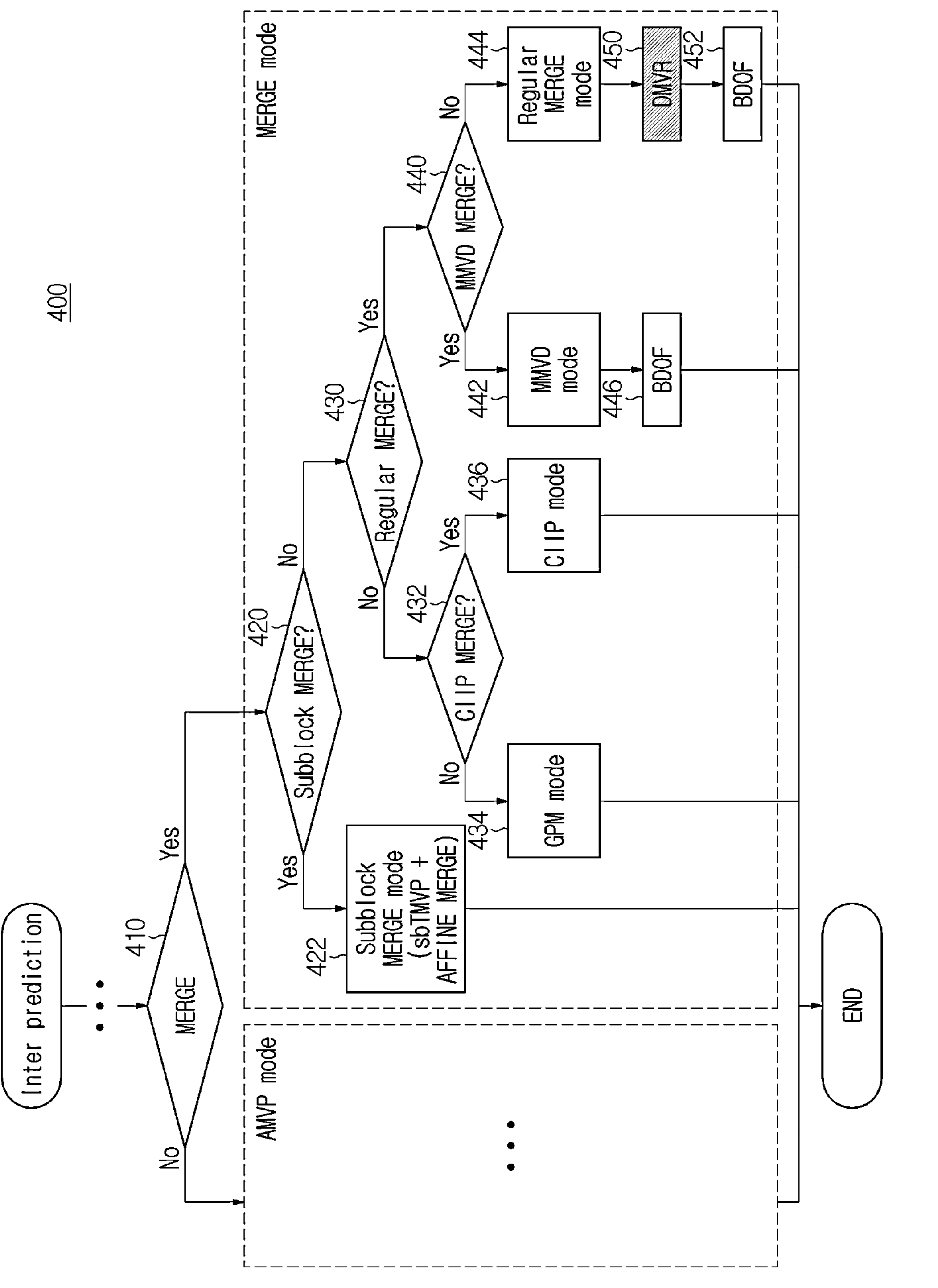
FIG. 4 is a diagram showing an embodiment of a method of determining one of various inter prediction methods in an inter prediction mode.

FIG. 4 is a diagram showing an embodiment (400) of a method of determining one of various inter prediction methods in inter prediction mode.

According to an embodiment (400), when a current block is predicted and encoded or decoded by inter prediction, in step 410, it is determined whether the inter prediction mode of the current block is a merge mode or an Advanced Motion Vector Prediction (AMVP) mode.

The merge mode is an inter prediction mode in which motion information such as a motion vector and reference picture of the current block is obtained from the neighboring blocks of the current block. On the other hand, according to the AMVP mode, a prediction motion vector is obtained from the neighboring blocks of the current block, and other motion information such as a motion vector difference and reference picture information excluding the prediction motion vector is obtained by parsing a bitstream. Therefore, the AMVP mode is different from the merge mode in which the motion information of the neighboring blocks is all used for prediction of the current block.

If the inter prediction mode of the current block is a merge mode, in step 420, it is determined whether the inter prediction mode of the current block is a subblock merge mode. If the inter prediction mode of the current block is the subblock merge mode, in step 422, the current block is partitioned into a plurality of subblocks according to the subblock merge mode, and each subblock may be predicted based on a motion vector according to affine transform.

If the inter prediction mode of the current block is not the subblock merge mode, in step 430, it is determined whether the inter prediction mode of the current block is a regular merge mode. If the inter prediction mode of the current block is not the regular merge mode, in step 432, it is determined whether the inter prediction mode of the current block is a combined intra inter prediction (CIIP) mode.

If the inter prediction mode of the current block is not the combined intra inter prediction mode, in step 434, the inter prediction mode of the current block is determined to be a geometric partition mode. The geometric partition mode is an inter prediction mode in which the current block is partitioned into two partitions based on a predetermined boundary and a final prediction block of the current block is determined by combining two prediction blocks for the two partitions. In step 436, the inter prediction mode of the current block is determined to be a combined intra inter prediction mode. According to the combined intra inter prediction mode, the final prediction block of the current block may be determined by combining the prediction block according to the intra prediction of the current block and the prediction block according to the inter prediction of the current block.

If the inter prediction mode of the current block is the regular merge mode, in step 440, it is determined whether the inter prediction mode of the current block is a merge mode with motion vector difference (MMVD). According to the merge mode with motion vector difference, the final motion vector of the current block is determined by adding a motion vector difference to the motion vector obtained from the neighboring block. In the merge mode with motion vector difference, the direction of the motion vector difference may be restricted to one of +x, −x, +y, and −y. In addition, in the merge mode with motion vector difference, the magnitude of the motion vector difference may be restricted to be selected from a limited number of predetermined size candidates.

If the inter prediction mode of the current block is the merge mode with motion vector difference, the current block is predicted according to the merge mode with motion vector difference. If the current block is bi-predicted, the prediction block of the current block may be adjusted by a bidirectional optical flow (BDOF) mode in step 446.

If the inter prediction mode of the current block is not the merge mode with motion vector difference, the regular merge mode is applied to the current block in step 444. If the current block is bi-predicted, the motion vector of the current block may be refined according to the decoder side motion vector refinement mode in step 450. In step 452, similar to step 446, the prediction block of the current block may be adjusted by the bidirectional optical flow mode.

Decoder side motion vector refinement is a method of refining a motion vector through a bilateral matching-based motion vector search process without parsing additional information in decoding a bidirectional motion vector derived in the regular merge mode. According to decoder side motion vector refinement, the accuracy of the motion vector in the regular merge mode can be improved. In addition, accordingly, the encoding efficiency of the regular merge mode can be improved.

In FIG. 4, the decoder side motion vector refinement mode is described as being applied only to the regular merge mode, but depending on the embodiment, the decoder side motion vector refinement mode may also be applied to the subblock merge mode, the geometric partition mode, the combined intra inter prediction mode, and the merge mode with motion vector difference.

Based on the flag information parsed from the bitstream, the inter prediction mode of the current block may be determined in steps 410, 420, 430, 432, and 440 of FIG. 4. For example, a merge flag may be parsed in step 410, a subblock merge flag may be parsed in step 420, a regular merge flag may be parsed in step 430, a combined intra inter prediction flag may be parsed in step 432, and a merge-with-motion-vector-difference merge flag may be parsed from the bitstream.

Hereinafter, embodiments of the decoder side motion vector refinement described in step 450 in the present invention will be described in detail. In the present invention, various embodiments of the conditions for performing the decoder side motion vector refinement are provided. In addition, an embodiment is provided in which a motion vector is searched based on template matching (TM) instead of searching for the motion vector based on bilateral matching in the decoder side motion vector refinement. In addition, an embodiment is provided in which different coding unit weights are used in the decoder side motion vector refinement.

In one embodiment of the decoder side motion vector refinement (DMVR) according to FIG. 4, a bidirectional motion vector predicted in regular merge mode is refined through a motion search based on bilateral matching (BM). According to an embodiment, neighboring blocks of a reference block may be searched from an initial motion vector to find an optimal reference block. For example, a motion vector that minimizes a degree of distortion between two reference blocks located in two reference pictures based on bilateral matching (BM) may be searched from the initial motion vector.

Decoder side motion vector refinement may not be to all bidirectional motion vectors predicted in regular merge mode and may be applied only to the case where one or more predetermined conditions are satisfied. The predetermined conditions are described below.

According to an embodiment, when a coding unit (CU) block is in merge mode, decoder side motion vector refinement may be applied. In addition, when a coding unit block is not in subblock merge mode to which inter prediction according to affine transform is applied, decoder side motion vector refinement may be applied. In addition, when merge mode with motion vector difference is not applied to a coding unit block, decoder side motion vector refinement may be applied.

According to an embodiment, when the coding unit block is in bi-prediction mode, decoder side motion vector refinement may be applied. Furthermore, according to an embodiment, when two reference pictures referred to by the coding unit block are respectively located in temporally opposite directions from a current picture, decoder side motion vector refinement may be applied. For example, when a first reference picture among the two reference pictures temporally precedes the current picture and a second reference picture temporally follows the current picture, decoder side motion vector refinement may be applied.

According to an embodiment, when the temporal distances between two reference pictures and the current picture are the same, decoder side motion vector refinement may be applied. The temporal distance may mean the magnitude of the POC (Picture Order Count) difference between the reference picture and the current picture. In the present invention, the distance between pictures represents the magnitude of the temporal distance and the POC difference.

In some embodiments, decoder side motion vector refinement may be applied even when the temporal distances between two reference pictures and the current picture are different. By not applying the same temporal distance condition, decoder side motion vector refinement may be applied more in regular merge mode. Accordingly, encoding efficiency can be improved as decoder side motion vector refinement is performed more by relaxing the above performance condition.

According to an embodiment, when two reference pictures are short-term reference pictures, decoder side motion vector refinement may be applied.

According to an embodiment, whether to apply decoder side motion vector refinement may be determined according to the size of coding unit block. For example, when the size of the coding unit block is greater than a predetermined size, decoder side motion vector refinement may be applied. The predetermined size may be expressed as the number of luminance samples included in the coding unit block. In addition, the predetermined size may be a power of 2, such as 64, 128, 256, 512, or 1024.

According to an embodiment, whether to apply decoder side motion vector refinement may be determined according to the width and height of the coding unit block. For example, when the height and/or width of the coding unit block is greater than a predetermined value, decoder side motion vector refinement may be applied. The predetermined value may be a power of 2, such as 4, 8, 16, or 32.

According to an embodiment, when the bidirectional coding unit weights applied to two prediction blocks of a coding unit block are identical to each other, decoder side motion vector refinement may be applied. The final prediction block of the coding unit block is determined to be a weighted average of two prediction blocks obtained from bi-prediction. In an embodiment, the bidirectional coding unit weights may be used to determine the weighted average of the two prediction blocks. However, in some embodiments, decoder side motion vector refinement may be set to be applied even when the bidirectional coding unit weights applied to the two prediction blocks are different from each other.

According to an embodiment, when combined intra inter prediction (CIIP) is not applied, decoder side motion vector refinement may be applied. According to an embodiment, combined intra inter prediction is a prediction method that determines a final prediction block by performing a weighted average of a first prediction block derived from intra prediction and a second prediction block derived from inter prediction for one block.

According to an embodiment, the conditions for performing decoder side motion vector refinement may include at least one of the multiple conditions described above.

As the conditions for performing decoder side motion vector refinement increase, the frequency of decoder side motion vector refinement may decrease. Conversely, as the conditions for performing decoder side motion vector refinement decrease, the frequency of decoder side motion vector refinement may increase. Therefore, the frequency of motion vector refinement and the encoding efficiency of the merge mode according to it may be determined according to the conditions of decoder side motion vector refinement.

Figure 5:
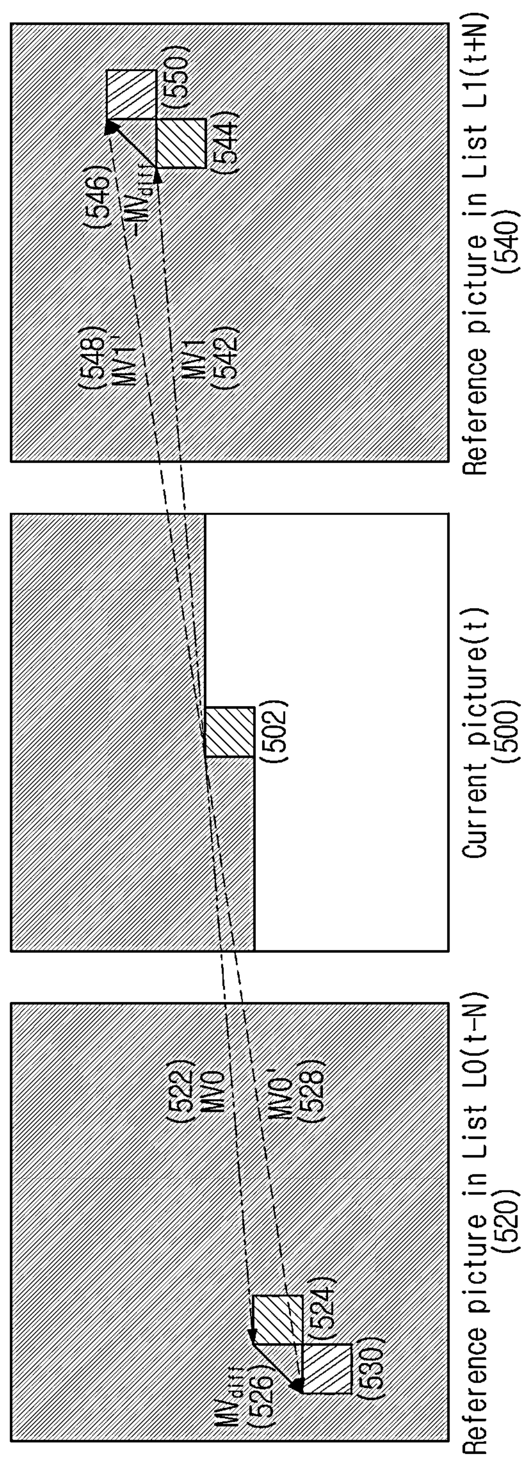
FIG. 5 is a diagram showing an embodiment of decoder side motion vector refinement when a temporal distance between a current picture and L0 reference picture and a temporal distance between the current picture and L1 reference picture are the same.

FIG. 5 shows an embodiment of decoder side motion vector refinement when a temporal distance between a current picture and L0 reference picture and a temporal distance between the current picture and L1 reference picture are the same.

In FIG. 5, a current block 500 and an L0 reference picture 520 have a POC distance of N. In addition, the current block 500 and the L1 reference picture 540 also have a POC distance of N. Therefore, a distance between the current block 500 and the L0 reference picture 520 and a distance between the current block 500 and the L1 reference picture 540 are the same.

The current block 500 may obtain initial motion vectors MV0 522 and MV1 542 in the L0 and L1 directions based on motion information of neighboring blocks. MV0 522 and MV1 542 indicate initial reference blocks 524 and 544, respectively. In some cases, since there may be a reference block more suitable for prediction of the current block around the initial reference blocks 524 and 544, a motion vector indicating a more suitable reference block is searched based on bilateral matching.

As described above, MV0 522 and MV1 542 are initial motion vectors in the L0 and L1 directions derived in the regular merge mode, respectively. MV0' 528 is a motion vector obtained by refining MV0 522, which is the initial motion vector in the L0 direction, by $MV_{diff}$ 526. In addition, MV1' 548 is a motion vector obtained by refining MV1 542, which is the initial motion vector in the L1 direction, by $-MV_{diff}$ 546. $MV_{diff}$ 526 and $-MV_{diff}$ 546 are an L0 motion vector difference and an L1 motion vector difference, respectively. The L0 motion vector difference and the L1 motion vector difference have the same magnitude, but their directions are set opposite.

If distortion between the reference block 530 indicated by MV0' 528 in the L0 reference picture 520 and the reference block 550 indicated by MV1' 548 in the L1 reference picture 540 is minimized, MV0' 528 and MV1' 548 may be determined to be final motion vectors of the current block 502. In various embodiments, various distortion measurement methods such as a sum of absolute difference (SAD) or a sum of squared error (SSE) between the two reference blocks may be used.

Finally, when MV0' 528 and MV1' 548 are the final motion vectors with minimum distortion, the two prediction blocks $P_{L0}$ 530 and $P_{L1}$ 550 are determined using the final motion vectors MV0' 528 and MV1' 548.

Hereinafter, unit-level bi-prediction with coding weights (BCW) will be described.

In bi-prediction with coding unit-level weight (BCW), a prediction block may be generated by applying adaptive weights to two prediction blocks derived from motion vectors in the L0 direction and the L1 direction. In bi-prediction with coding unit-level weight, a prediction block may be calculated using Equation 1.

$$Pred_{bi-pred} = ((8-w)\times P_0 + w\times P_1 + 4) \gg 3 \qquad \text{[Equation 1]}$$

where, P0 and P1 represent a motion-refined prediction block from the L0 reference picture and a motion-refined prediction block from the L1 reference picture, respectively. w represents a weight applied to each reference block, and the value of w is determined differently depending on whether the current picture is a low-delay picture or not. If the current picture is a low-delay picture, five weights ($w\in\{-2, 3, 4, 5, 10\}$) may be used. If the current picture is not a low-delay picture, three weights ($w\in\{3, 4, 5\}$) may be used.

In bi-prediction with coding unit-level weight, if the current coding unit (CU) block is in merge mode, the weight information may be derived from a merge candidate block. If the current block is not in merge mode, the weight information may be parsed after the motion vector difference information is parsed.

Equation 2 shows a method of generating a final prediction block using decoder side motion vector refinement.

$$Pred_{Final} = (P_{L0} + P_{L1} + 1) \gg 1 \qquad \text{[Equation 2]}$$

In Equation 2, $P_{L0}$, $P_{L1}$ and $P_{redFinal}$ represent a prediction block indicated by the MV0' motion vector in the L0 reference picture, a prediction block indicated by the MV1' motion vector in the L1 reference picture, and a final prediction block generated using the two prediction blocks, respectively. As shown in FIG. 5, since the temporal distance between the current picture and the L0 reference picture and the temporal distance between the current picture and the L1 reference picture are the same, the same weight may be assigned to the prediction blocks $P_{L0}$ and $P_{L1}$ generated from the respective reference pictures to generate the final prediction block.

A method of generating a prediction block according to a decoder side motion vector refinement method according to an embodiment may be used only when the temporal distance between the current picture and the L0 reference picture and the temporal distance between the current picture and the L1 reference picture are the same. In this case, a prediction block may be generated by averaging two prediction blocks generated from two reference pictures. However, if the prediction block is generated using the average in all cases, there may be a limit to the encoding efficiency. Therefore, when generating the final prediction block, the final prediction block may be generated by assigning different weights to the L0 prediction block $P_{L0}$ and the L1 prediction block $P_{L1}$. In this case, in order to generate the final prediction block by assigning adaptive weights to the two prediction blocks, Equation 1 for generating the final prediction block in bi-prediction with CU-level weight (BCW) may be used.

In bi-prediction with CU-level weight, different weights may be used depending on whether the current picture is a low-delay picture. In bi-prediction with CU-level weight, if the current coding unit (CU) block is in merge mode, the weight information may be derived from the merge candidate block. Otherwise, if it is not in merge mode, the weight information may be parsed from the bitstream.

According to an embodiment, in bi-prediction with CU-level weight, a prediction block may be generated according to the determined weights. For example, five weights ($w \in \{-2, 3, 4, 5, 10\}$) used in low-delay pictures may be used to generate a prediction block. Alternatively, three weights ($w \in \{3, 4, 5\}$) used in a case other than a low-delay picture may be used to generate a prediction block. Alternatively, a predetermined arbitrary weight may be used. In this case, the number of weights used may be determined arbitrarily.

According to an embodiment, the weight information determined by the encoder is transmitted and parsed. In various embodiments, as a method of transmitting/parsing the weight information, a fixed length code (FLC), a unary code, or a truncated binary code may be used in consideration of the used weight.

Instead, the bidirectional coding unit weights may be determined based on the temporal distance between the current picture and the L0 reference picture and the temporal distance between the current picture and the L1 reference picture.

Hereinafter, a method of applying decoder side motion vector refinement and a method of generating a final prediction block when the temporal distance between the current picture and the L0 reference picture and the temporal distance between the current picture and the L1 reference picture are not the same is described.

If the application condition of decoder side motion vector refinement method requires the condition that the temporal distance between the current picture and the L0 reference picture and the temporal distance between the current picture and the L1 reference picture be the same, decoder side motion vector refinement is not applied to the current block when the temporal distance between the current picture and the L0 reference picture and the temporal distance between the current picture and the L1 reference picture are not the same. However, if the above condition is excluded from the application condition of the decoder side motion vector refinement method, decoder side motion vector refinement may be applied to the current block even if the temporal distance between the current picture and the L0 reference picture and the temporal distance between the current picture and the L1 reference picture are not the same.

Therefore, when the temporal distance between the current picture and the L0 reference picture and the temporal distance between the current picture and the L1 reference picture are not the same, various embodiments for decoder side motion vector refinement and derivation of the final prediction block may be discussed. In the present invention, an embodiment for the relationship between the L0 motion vector difference and the L1 motion vector difference for decoder side motion vector refinement will be discussed below. In addition, an embodiment for the weight required for determining the final prediction block in the present invention will be discussed below.

Figure 6:
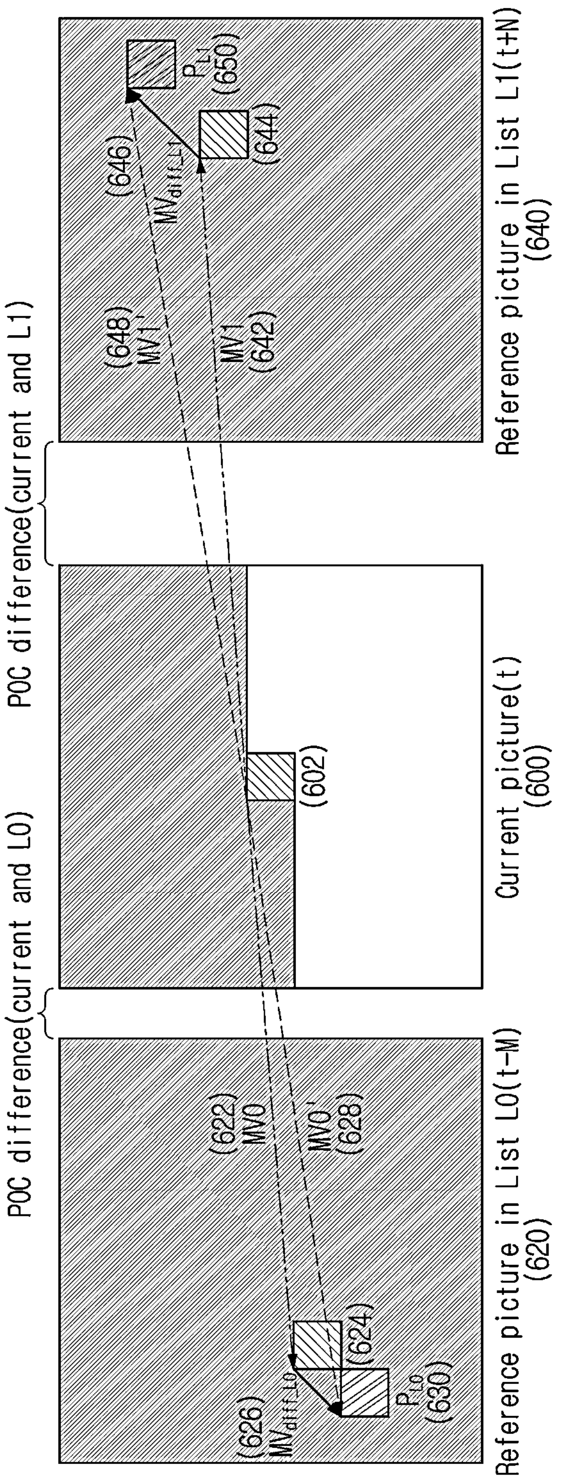
FIG. 6 is a diagram showing decoder side motion vector refinement when the temporal distance between the current picture and L0 reference picture and the temporal distance between the current picture and L1 reference picture are not the same.

FIG. 6 illustrates decoder side motion vector refinement when a temporal distance between a current picture and an L0 reference picture and a temporal distance between the current picture and an L1 reference picture are not the same.

In FIG. 6, a current picture 600 is a picture at time t, and an L0 reference picture 620 and an L1 reference picture 640 are pictures at time t−M (t−M>0) and time t+N (t+N>0), respectively (t−M<t+N). Here, M and N are different (M<N) arbitrary positive integer values. Therefore, as shown in FIG. 6, the temporal distance between the L0 reference picture 620 and the current picture 600 and the temporal distance between the L1 reference picture 640 and the current picture 600 are not the same.

According to FIG. 6, the L0-direction motion vector MV0 622 and the L1-direction motion vector MV1 642 derived in regular merge mode are initial motion vectors. MV0 622 and MV1 642 indicate initial reference blocks 624 and 644, respectively. In addition, a motion vector MV0' 628 is determined by refining MV0 622 by $MV_{diff\_L0}$ 626. In addition, the motion vector MV1' 648 is determined by refining MV1 642 by $MV_{diff\_L1}$ 646. $MV_{diff\_L1}$ 646 may be determined from $MV_{diff\_L0}$ 626 in consideration of the ratio of the temporal distance between the current picture and the L0 reference picture and the temporal distance between the current picture and the L1 reference picture. The motion vectors MV0' 628 and MV1' 648 may be derived as the final motion vectors in the L0 direction and the L1 direction, respectively, when distortion between block Pro 630 and block $P_{L1}$ 650 is the smallest. Equation 3 shows a method of calculating $MV_{diff\_L1}$ corresponding to $MV_{diff\_L0}$ in consideration of the ratio of the temporal distance between the current picture and the L0 reference picture and the temporal distance between the current picture and the L1 reference picture.

[Equation 3]

$$MV_{diff\_L1\_X} = -\frac{N}{M} \times MV_{diff\_L0\_x}$$

$$MV_{diff\_L1\_y} = -\frac{N}{M} \times MV_{diff\_L0\_y}$$

In Equation 3, M and N represent the temporal distance between the current picture and the L0 reference picture and the temporal distance between the current picture and the L1 reference picture, respectively. Here, M and N are different arbitrary positive integer values. Also, in Equation 3, $MV_{diff\_L1\_x}$, $MV_{diff\_L1\_y}$, $MV_{diff\_L0\_x}$/and $MV_{diff\_L0\_y}$ represent the x-direction motion information of $MV_{diff\_L1}$, the y-direction motion information of $MV_{diff\_L1}$, the x-direction motion information of $MV_{diff\_L0}$, and the y-direction motion information of $MV_{diff\_L0}$, respectively. As shown in Equation 3, $MV_{diff\_L1}$ corresponding to $MV_{diff\_L0}$ is calculated symmetrically by considering the ratio (M:N) of the temporal distance between the current picture and the L0 reference picture and the temporal distance between the current picture and the L1 reference picture. The motion vector MV1', which is obtained by refining the motion vector MV1 in the L1-direction by the calculated $MV_{diff\_L1}$ ($MV_{diff\_L1\_x}$ and $MV_{diff\_L1\_y}$), may be derived to be the final motion vector in the L1 direction. In Equation 3, the motion information of $MV_{diff\_L1}$ is calculated by reflecting the ratio of the temporal distance between the current picture and the L0 reference picture and the temporal distance between the current picture and the L1 reference picture to the motion information of $MV_{diff\_L0}$. Conversely, the motion information of $MV_{diff\_L0}$ may also be calculated by reflecting the ratio of the temporal distance between the current picture and the L0 reference picture and the temporal distance between the current picture and the L1 reference picture to the motion information of $MV_{diff\_L1}$.

$MV_{diff\_L1\_x}$ and $MV_{diff\_L1\_y}$ determined in Equation 3 are determined by multiplying $MV_{diff\_L0\_x}$ and $MV_{diff\_L0\_y}$ by N/M, and thus the values of $MV_{diff\_L1\_x}$ and $MV_{diff\_L1\_y}$ may be non-integer values. Therefore, according to an embodiment, $MV_{diff\_L1\_x}$ and $MV_{diff\_L1\_y}$ may be adjusted to values in integer units. In an embodiment, $MV_{diff\_L1\_x}$ and $MV_{diff\_L1\_y}$ may be integerized according to a rounding or truncation process. Alternatively, $MV_{diff\_L1\_x}$ and $MV_{diff\_L1\_y}$ may be adjusted with a predetermined precision other than an integer unit according to a rounding or truncation process. The predetermined precision may be ½, ¼, etc.

According to an embodiment, the absolute values of $MV_{diff\_L1\_x}$, $MV_{diff\_L1\_y}$, $MV_{diff\_L0\_x}$, and $MV_{diff\_L0\_y}$ may be limited within a predetermined range. The predetermined range may be determined to be integer sample units of 1, 2, 4, 8, etc. In addition, the predetermined ranges of $MV_{diff\_L1\_x}$ and $MV_{diff\_L1\_y}$ may be determined differently from the predetermined range of $MV_{diff\_L0\_x}$ and $MV_{diff\_L0\_y}$ in consideration of the ratio of M and N. For example, the absolute values of $MV_{diff\_L1\_x}$, $MV_{diff\_L1\_y}$, $MV_{diff\_L0\_x}$, and $MV_{diff\_L0\_y}$ may be set to be less than or equal to one of 1, 2, 4 and 8.

As described above, the motion vector accuracy may be improved by refining the motion vector in consideration of the ratio of the temporal distance between the current picture and the L0 reference picture and the temporal distance between the current picture and the L1 reference picture.

Hereinafter, an embodiment of a weight required to determine a final prediction block is described.

As shown in FIG. 6, if the temporal distance between the current picture and the L0 reference picture and the temporal distance between the current picture and the L1 reference picture are not the same, when applying the decoder side motion vector refinement method, the bidirectional coding unit weight may be determined in consideration of the temporal distance between the current picture and the L0 reference picture and the temporal distance between the current picture and the L1 reference picture. In addition, the final prediction block may be generated according to the determined weight.

According to an embodiment, as shown in FIG. 5, when the temporal distance between the current picture and the L0 reference picture and the temporal distance between the current picture and the L1 reference picture are the same, the final prediction block for the current block may be generated by using the same weight for the prediction blocks $P_{L0}$ and $P_{L1}$ indicated by the refined motion vectors MV0' and MV1', as shown in Equation 2.

However, when the temporal distance between the current picture and the L0 reference picture and the temporal distance between the current picture and the L1 reference picture are not the same as shown in FIG. 6, the weight to be applied to each prediction block may be determined in consideration of the temporal distance between the current picture and the L0 reference picture and the temporal distance between the current picture and the L1 reference picture.

As described above, L0- and L1-direction motion vectors MV0 and MV1 may be determined to be initial motion vectors. Then, using motion vector MV0' obtained by refining L0-direction motion vector MV0 by $MV_{diff\_L0}$ and motion vector MV1' obtained by refining L1 direction motion vector MV1 by $MV_{diff\_L1}$, the prediction block Pro in the L0 direction and the prediction block $P_{L1}$ in the L1 direction may be determined.

The final prediction block is calculated using different weights according to the ratio of the temporal distance between the current picture and the L0 reference picture and the temporal distance between the current picture and the L1 reference picture. Hereinafter, Equation 4 shows a method of generating a final prediction block by generating each prediction block using a refined motion vector in a decoder and assigning different weights to respective prediction blocks in consideration of the temporal distance between the current picture and the L0 reference picture and the temporal distance between the current picture and the L1 reference picture.

$$Pred_{Final} = \frac{N}{M+N} \times P_{L0} + \frac{M}{M+N} \times P_{L1} \quad \text{[Equation 4]}$$

In Equation 4, M and N represent the temporal distance between the current picture and the L0 reference picture and the temporal distance between the current picture and the L1 reference picture, respectively. Here, M and N are different (M<N) arbitrary positive integer values. As shown in Equation 4, the weight $$\frac{N}{M+N}$$

of $P_{L0}$ and the weight $$\frac{M}{M+N}$$

of $P_{L1}$ are calculated by considering the ratio of the temporal distance between the current picture and the L0 reference picture and the temporal distance between the current picture and the L1 reference picture. According to Equation 4, a larger weight $$\frac{N}{M+N} > \frac{M}{M+N}$$

is assigned to the prediction block $P_{L0}$ of a reference picture closer to the current picture. Conversely, a smaller weight $$\frac{N}{M+N} > \frac{M}{M+N}$$

is assigned to the prediction block $P_{L1}$ of a reference picture farther from the current picture. Since the weight used in Equation 4 is derived in consideration of the ratio of the temporal distance between the current picture and the L0 reference picture and the temporal distance between the current picture and the L1 reference picture, there is no need to explicitly obtain weight information from the bitstream.

According to an embodiment, even if the temporal distance between the current picture and the L0 reference picture and the temporal distance between the current picture and the L1 reference picture are not the same, the weight information may be parsed from the bitstream. According to an embodiment, even if the temporal distance between the current picture and the L0 reference picture and the temporal distance between the current picture and the L1 reference picture are different, the weight may be determined in consideration of the characteristics of the pictures, or the weight may be determined by obtaining the weight information from the bitstream.

In addition, a predetermined arbitrary weight may be used to generate the prediction block. For example, a weight used in a low-delay picture may be applied, or a weight used in a case other than a low-delay picture may be applied. Alternatively, a predetermined arbitrary weight value may be applied. In this case, the number of weights used may also be determined arbitrarily.

The weight information determined by the encoder may be parsed from the bitstream. In various embodiments, as the method of transmitting/parsing the weight information, any efficient method such as a fixed length code (FLC), a unary code, or a truncated binary code may be used in consideration of the used weight.

According to an embodiment, decoder side motion vector refinement and final prediction block generation may be performed using a template matching method.

In the decoder side motion vector refinement method, a template matching (TM) method may be applied instead of a bilateral matching (BM) method. Regardless of whether the temporal distance between the current picture and the L0 reference picture and the temporal distance between the current picture and the L1 reference picture are the same, the template matching method may be applied to the decoder side motion vector refinement method.

Figure 7:
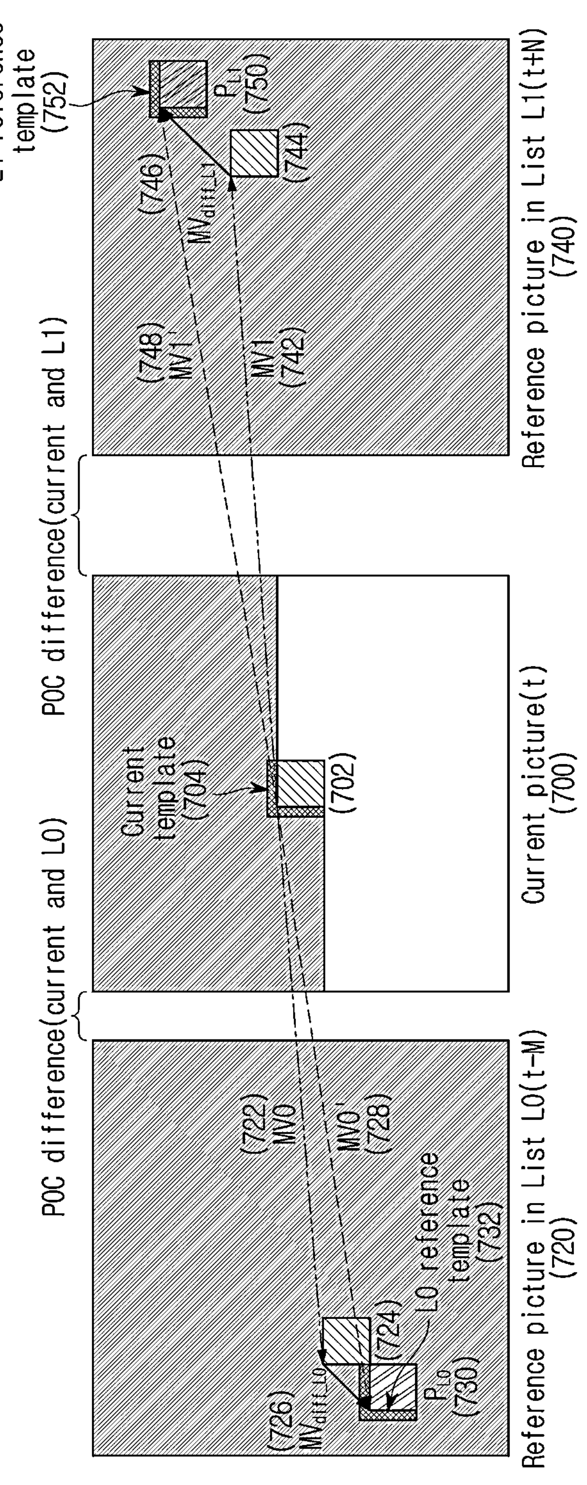
FIG. 7 illustrates decoder side motion vector refinement based on a template matching method.

FIG. 7 illustrates decoder side motion vector refinement based on a template matching method.

In FIG. 7, a current picture 700 is a picture at time t, and an L0 reference picture 720 and an L1 reference picture 740 are pictures at time t−M (t−M>0) and time t+N (t+N>0), respectively (t−M<t+N). Here, M and N are different (M<N) arbitrary positive integer values. Therefore, as shown in FIG. 7, the temporal distance between the L0 reference picture 720 and the current picture 700 and the temporal distance between the L1 reference picture 740 and the current picture 700 are not equal to M and N, respectively.

In FIG. 7, final motion vectors MV0' 728 and MV1' 748 may be determined by comparing a current template 704, an L0 reference template 732, and an L1 reference template 752 based on the template matching method. Then, the final prediction block may be generated based on the prediction blocks $P_{L0}$ 730 and $P_{L1}$ 750 derived from the determined final motion vectors MV0' 728 and MV1' 748.

In the decoder side motion vector refinement method based on template matching, the motion vector MV0 722 in the L0 direction and the motion vector MV1 742 in the L1 direction derived in regular merge mode are determined to be the initial motion vectors. In addition, the motion vector that minimizes the degree of distortion of the current template 704, the L0 reference template 732, and the L1 reference template 752 may be searched based on the two initial motion vectors. In addition, the motion vectors with the least distortion may be determined to be the final motion vectors MV0' 728 and MV1' 748.

$MV_{diff\_L1}$ may be calculated from $MV_{diff\_L0}$ in consideration of the ratio of the temporal distance between the current picture and the L0 reference picture and the temporal distance between the current picture and the L1 reference picture. $MV_{diff\_L1}$ may be calculated according to Equation 3 described above. Contrary to Equation 3, $MV_{diff\_L0}$ may also be calculated based on $MV_{diff\_L1}$ and the ratio of the temporal distance between the current picture and the L0 reference picture and the temporal distance between the current picture and the L1 reference picture.

According to the decoder side motion vector refinement method based on template matching of the present invention, a motion vector that minimizes distortion between templates based on the initial motion vectors MV0 and MV1 is searched in two reference pictures. In an embodiment, the search may be performed based on $MV_{diff\_L0}$ and $MV_{diff\_L1}$ representing refinement motion vectors of the initial motion vectors. $MV_{diff\_L0}$ and $MV_{diff\_L1}$ have opposite signs, and a ratio of the magnitudes of $MV_{diff\_L0}$ and $MV_{diff\_L1}$ may be determined according to the ratio of the temporal distance between the L0 reference picture and the current picture and the temporal distance between the L1 reference picture and the current picture. By adding $MV_{diff\_L0}$ and $MV_{diff\_L1}$ to MV0 and MV1, respectively, refined motion vectors MV0' and MV1' may be determined.

In order to obtain the distortion by the refined motion vectors MV0' and MV1', a final template is generated using the reference template (L0 reference template) of the block indicated by MV0' and the reference template (L1 reference template) of the block indicated by MV1'. In addition, the degree of distortion between the generated final template and the current template is determined. The degree of distortion is calculated for each of the MV0' and MV1' candidates for a certain range of $MV_{diff\_L0}$ and $MV_{diff\_L1}$. In addition, MV0' and MV1' with the minimum distortion are determined to be the final motion vectors. In various embodiments, various distortion measurement methods such as the sum of absolute difference (SAD) or the sum of squared error (SSE) may be used. Equations 5 and 6 show a method of calculating the final template from the L0 reference template and the L1 reference template.

$$\text{Template}_{final} = (\text{Template}_{L0} + \text{Template}_{L1} + 1) \gg 1 \quad \text{[Equation 5]}$$

$$\text{Template}_{final} = \frac{N}{M+N} \times \text{Template}_{L0} + \frac{M}{M+N} \times \text{Template}_{L1} \quad \text{[Equation 6]}$$

In Equation 5 and Equation 6, $\text{Template}_{L0}$, $\text{Template}_{L1}$, and $\text{Template}_{final}$ represent an L0 reference template, an L1 reference template, and a final template, respectively. According to Equation 5, the final template is calculated as the average of the templates of the two reference pictures, regardless of the ratio of the temporal distance between the L0 reference picture and the current picture and the temporal distance between the L1 reference picture and the current picture. On the other hand, according to Equation 6, the final template is calculated from the L0 reference template and the L1 reference template according to the ratio of the temporal distance between the L0 reference picture and the current picture and the temporal distance between the L1 reference picture and the current picture. The final template may be calculated using any one of Equations 5 and 6.

The decoder side motion vector refinement method based on template matching may be applied to refinement of bidirectional motion vector predicted in regular merge mode.

Hereinafter, embodiments of a method of determining a weight based on template matching are described.

According to FIG. 7, a motion vector MV0' 728 obtained by refining MV0 722 by $MV_{diff\_L0}$726 and a motion vector MV1' 748 obtained by refining MV1 742 by $MV_{diff}$ L1 746 are obtained from an initial motion vector MV0 722 in the L0 direction and an initial motion vector MV1 742 in the L1 direction. In addition, an L0 reference template 732 of a block indicated by the motion vector MV0' 728 in the L0 reference picture 720 and an L1 reference template 752 of a block indicated by the motion vector MV1' 748 in the L1 reference picture 740 are determined. If distortion between the L0 reference template 732 and the current template 704 is defined as $D_{L0}$ and distortion between the L1 reference template 752 and the current template 704 is defined as $D_{L1}$, the final prediction block may be calculated using Equation 7.

$$Pred_{Final} = \frac{D_{L1}}{D_{L0} + D_{L1}} \times P_{L0} + \frac{D_{L0}}{D_{L0} + D_{L1}} \times P_{L1} \quad \text{[Equation 7]}$$

According to Equation 7, the weight $$\frac{D_{L1}}{D_{L0} + D_{L1}}$$

of the prediction block $P_{L0}$ in the L0 direction is calculated using distortion Du between the L1 reference template and the current template. Conversely, the weight $$\frac{D_{L0}}{D_{L0} + D_{L1}}$$

of the prediction block PL1 in the L1 direction is calculated using distortion $D_{L0}$ between the L0 reference template and the current template. The difference in these weights is due to the fact that a smaller distortion value indicates a larger similarity between the current signal and the reference signal, and conversely, a larger distortion value indicates a smaller similarity between the current signal and the reference signal. The distortion between the current template and the reference template may be determined based on any distortion measurement method, such as the sum of absolute difference (SAD) or the sum of squared error (SSE).

The above-described embodiments of the decoder side motion vector refinement method may be combined within a range that does not conflict with each other.

In the decoder side motion vector refinement method, the ratio of the distances between two reference pictures and the current picture may be considered. Alternatively, the decoder side motion vector refinement method may be performed without considering the ratio of the distances between two reference pictures and the current picture. In addition, in the decoder side motion vector refinement method, a bilateral matching method or a template matching method may be used.

In a method of determining a weight for motion vector refinement, distance information between the two reference pictures and the current picture may be considered. Alternatively, the weight may be determined by transmitting/parsing weight information from the bitstream. Alternatively, the weight may be determined based on a distortion value based on template matching.

Therefore, any of the various methods mentioned above may be used for motion vector refinement, and any of the various methods mentioned above may be used for weight determination. Accordingly, the motion vector refinement method and the weight determination method may be independently selected and used.

Therefore, any combination of the decoder side motion vector refinement method for selecting a bidirectional prediction block in the decoder and the method of determining the weight in order to generate the final prediction block may be implemented.

Figure 8:
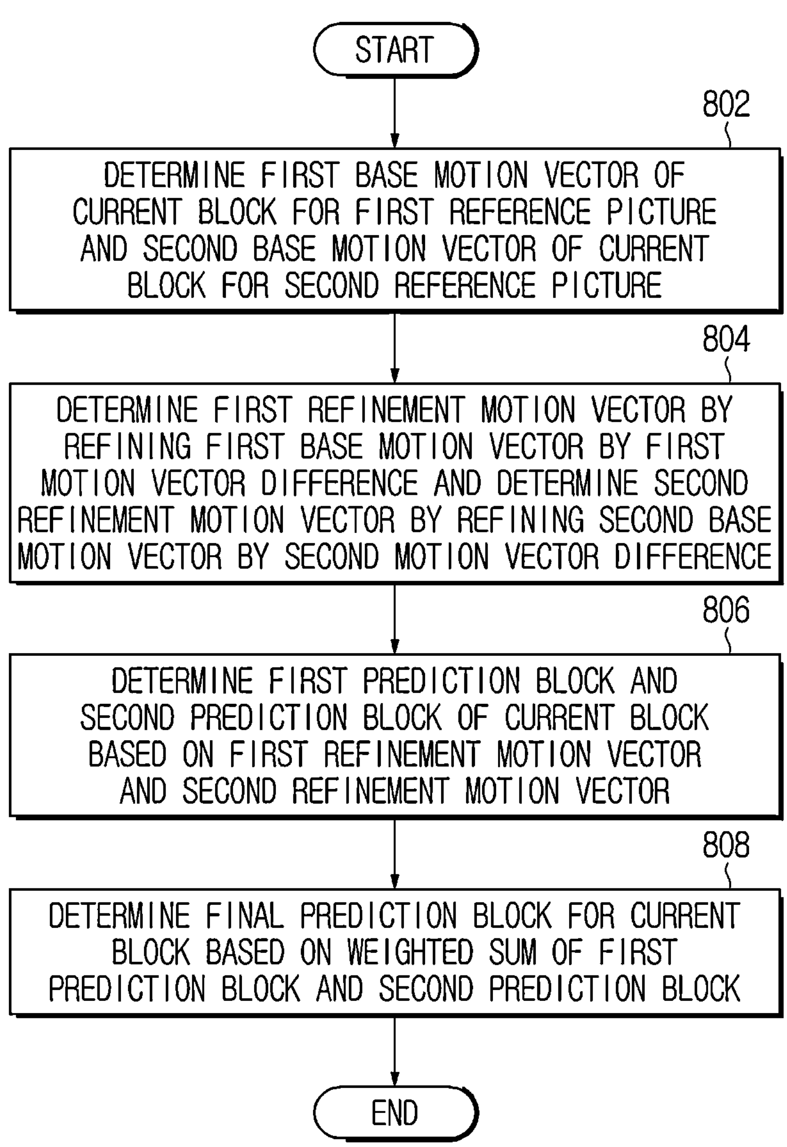
FIG. 8 is a flowchart of a decoder side motion vector refinement method according to an embodiment.

FIG. 8 is a flowchart of a decoder side motion vector refinement method according to an embodiment.

In step 802, a first base motion vector of a current block for a first reference picture and a second base motion vector of the current block for a second reference picture are determined. According to an embodiment, the first reference picture and the second reference picture are located in different temporal directions from the current block.

In step 804, a first refinement motion vector is determined by refining the first base motion vector by a first motion vector difference, and a second refinement motion vector is determined by refining the second base motion vector by a second motion vector difference.

According to an embodiment, when a distance between the current picture including the current block and the first reference picture and a distance between the current picture and the second reference picture are different, the first refinement motion vector and the second refinement motion vector may be determined. Alternatively, the first refinement motion vector and the second refinement motion vector may be determined regardless of the relationship between the distance between the current picture including the current block and the first reference picture and the distance between the current picture and the second reference picture.

According to an embodiment, a ratio of a magnitude of the first motion vector difference and a magnitude of the second motion vector difference may be set to be proportional to a ratio of a distance between the current picture and the first reference picture and a distance between the current picture and the second reference picture.

According to an embodiment, the magnitudes of the first motion vector difference and the second motion vector difference are limited within a predetermined range.

According to an embodiment, the first refinement motion vector and the second refinement motion vector may be determined so that distortion between the first prediction block indicated by the first refinement motion vector and the second prediction block indicated by the second motion vector is minimized according to the motion vector search based on bilateral matching.

According to an embodiment, the first refinement motion vector and the second refinement motion vector may be determined so that distortion between a first template of the first prediction block indicated by the first refinement motion vector, a second template of the second prediction block indicated by the second refinement motion vector, and a current template of the current block is minimized according to the motion vector search based on template matching. The distortion may be calculated based on the final template determined by the weighted average of the first template and the second template and the current template.

According to an embodiment, in a weighted average of the first template and the second template, the first weight applied to the first template may be set to be proportional to the distance between the current picture and the second reference picture, and the second weight applied to the second template may be set to be proportional to the distance between the current picture and the first reference picture. In addition, a weighted average value of the first template and the second template may be determined based on the set first and second weights.

In step 806, a prediction block and second prediction block of the current block are determined based on the first refinement motion vector and the second refinement motion vector.

In step 808, a final prediction block for the current block is determined based on the weighted sum of the first prediction block and the second prediction block.

According to an embodiment, the weighted sum of the first prediction block and the second prediction block may be determined by a weight determined according to the distance between the current picture and the first reference picture and the distance between the current picture and the second reference picture.

According to an embodiment, the first weight applied to the first prediction block may be set to be proportional to the distance between the current picture and the second reference picture, and the second weight applied to the second prediction block may be set to be proportional to the distance between the current picture and the first reference picture.

According to an embodiment, the first weight applied to the first prediction block may be determined to be proportional to the distortion of the second template and the current template, and the second weight applied to the second prediction block may be determined to be proportional to the distortion of the first template and the current template.

According to an embodiment, the weighted sum of the first prediction block and the second prediction block may be determined by a weight determined based on a picture type of a current picture including the current block.

According to an embodiment, the weighted sum of the first prediction block and the second prediction block may be determined by a weight determined based on weight information generated by parsing the bitstream.

In the decoder, the current block may be reconstructed based on the final prediction block of the current block reconstructed according to the decoder side motion vector refinement method of FIG. 8. In the encoder, the current block may be encoded based on the final prediction block of the current block reconstructed according to the decoder side motion vector refinement method of FIG. 8.

A computer-readable recording medium storing a bitstream generated by a video encoding method applied to the decoder side motion vector refinement method of FIG. 8 may be provided. The bitstream generated by the video encoding method applied to the decoder side motion vector refinement method of FIG. 8 may be stored in a computer-recordable recording medium. In addition, the bitstream generated by the video encoding method applied to the decoder side motion vector refinement method of FIG. 8 may be transmitted from a video encoding apparatus to a video decoding apparatus.

A bitstream for video data stored in a computer-recordable recording medium may be decoded by a video decoding method applied to the decoder side motion vector refinement method of FIG. 8. In addition, a bitstream transmitted from a video encoding apparatus to a video decoding apparatus may be decoded by a video decoding method applied to the decoder side motion vector refinement method of FIG. 8.

Figure 9:
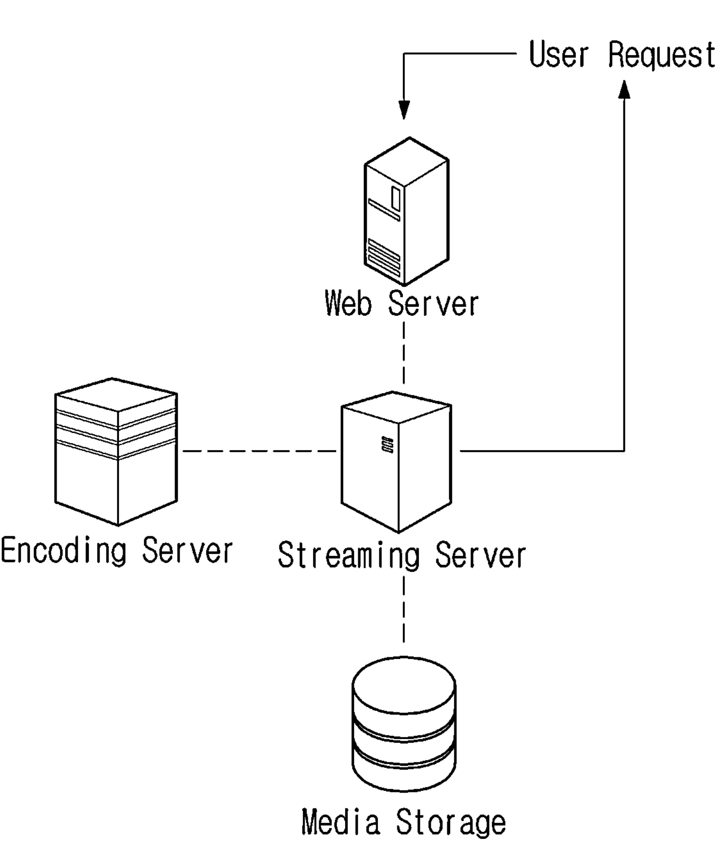
FIG. 9 exemplarily illustrates a content streaming system to which an embodiment according to the present invention is applicable.

FIG. 9 exemplarily illustrates a content streaming system to which an embodiment according to the present invention is applicable.

As illustrated in FIG. 9, a content streaming system to which an embodiment of the present invention is applied may largely include an encoding server, a streaming server, a web server, a media storage, a user device, and a multimedia input device.

The encoding server compresses content received from multimedia input devices such as smartphones, cameras, CCTVs, etc. into digital data to generate a bitstream and transmits it to the streaming server. As another example, if multimedia input devices such as smartphones, cameras, CCTVs, etc. directly generate a bitstream, the encoding server may be omitted.

The bitstream may be generated by an image encoding method and/or an image encoding apparatus to which an embodiment of the present invention is applied, and the streaming server may temporarily store the bitstream in the process of transmitting or receiving the bitstream.

The streaming server transmits multimedia data to a user device based on a user request via a web server, and the web server may act as an intermediary that informs the user of any available services. When a user requests a desired service from the web server, the web server transmits it to the streaming server, and the streaming server may transmit multimedia data to the user. At this time, the content streaming system may include a separate control server, and in this case, the control server may control commands/responses between devices within the content streaming system.

The streaming server may receive content from a media storage and/or an encoding server. For example, when receiving content from the encoding server, the content may be received in real time. In this case, in order to provide a smooth streaming service, the streaming server may store the bitstream for a certain period of time.

Examples of the user devices may include mobile phones, smartphones, laptop computers, digital broadcasting terminals, personal digital assistants (PDAs), portable multimedia players (PMPs), navigation devices, slate PCs, tablet PCs, ultrabooks, wearable devices (e.g., smartwatches, smart glasses, HMDs), digital TVs, desktop computers, digital signage, etc.

Each server in the above content streaming system may be operated as a distributed server, in which case data received from each server may be distributed and processed.

The above embodiments may be performed in the same or corresponding manner in the encoding apparatus and the decoding apparatus. In addition, an image may be encoded/decoded using at least one or a combination of at least one of the above embodiments.

The order in which the above embodiments are applied may be different in the encoding apparatus and the decoding apparatus. Alternatively, the order in which the above embodiments are applied may be the same in the encoding apparatus and the decoding apparatus.

The above embodiments may be performed for each of the luma and chroma signals. Alternatively, the above embodiments for the luma and chroma signals may be performed identically.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field.

A bitstream generated by the encoding method according to the above embodiment may be stored in a non-transitory computer-readable recording medium. In addition, a bitstream stored in the non-transitory computer-readable recording medium may be decoded by the decoding method according to the above embodiment.

Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It should be appreciated by those having ordinary skill in the art to which the present invention pertains that various modifications and changes may be made from the above description.

Therefore, the spirit of the present invention is not limited to the above-described embodiments, and the entire scope of the appended claims and their equivalents fall within the scope and spirit of the invention.

The present invention may be used in an apparatus for encoding/decoding an image and a recording medium for storing a bitstream.

The invention claimed is:

1. A video decoding method comprising:

determining a first base motion vector of a current block for a first reference picture and a second base motion vector of the current block for a second reference picture;

determining a first motion vector difference in response to a first distance between a current picture including the current block and the first reference picture and a second distance between the current picture and the second reference picture being different, without parsing information regarding motion vector differences from a bitstream, wherein an absolute value of the first motion vector difference is limited within a predetermined range;

determining a second motion vector difference based on the first motion vector difference;

determining a first refinement motion vector by refining the first base motion vector by the first motion vector difference and a second refinement motion vector by refining the second base motion vector by the second motion vector difference;

determining first and second prediction blocks of the current block based on the first refinement motion vector and the second refinement motion vector; and determining a final prediction block for the current block based on a weighted sum of the first prediction block and the second prediction block, wherein the first motion vector difference is selected, based on a distortion between the first and second prediction blocks, obtained using the first motion vector difference, being minimal, and wherein a first weight applied to the first prediction block and a second weight applied to the second prediction block are derived based on a result of a template matching among a first template corresponding to the first refinement motion vector, a second template corresponding to the second refinement motion vector, and a current template of the current block.

2. The video decoding method of claim 1, wherein the weighted sum of the first prediction block and the second prediction block is determined by a weight determined according to a distance between a current picture and the first reference picture and the distance between the current picture and the second reference picture.

3. The video decoding method of claim 2, wherein:

a first weight applied to the first prediction block is proportional to the distance between the current picture and the second reference picture; and a second weight applied to the second prediction block is proportional to the distance between the current picture and the first reference picture.

4. The video decoding method of claim 1, wherein in the determining of the first refinement motion vector and the second refinement motion vector, a ratio of a magnitude of the first motion vector difference and a magnitude of the second motion vector difference is proportional to a ratio of the distance between the current picture and the first reference picture and the distance between the current picture and the second reference picture.

5. The video decoding method of claim 1, wherein the first refinement motion vector and the second refinement motion vector are determined to minimize distortion between a first template of the first prediction block indicated by the first refinement motion vector, a second template of the second prediction block indicated by the second refinement motion vector and a current template of the current block.

6. The video decoding method of claim 5, wherein the distortion is calculated based on a final template determined by a weighted average of the first template, the second template and the current template.

7. The video decoding method of claim 6, wherein in the weighted average of the first template and the second template, a first weight applied to the first template is proportional to a distance between a current picture and the second reference picture and a second weight applied to the second template is proportional to a distance between the current picture and the first reference picture.

8. The video decoding method of claim 1, wherein the weighted sum of the first prediction block and the second prediction block is determined by a weight determined based on a picture type of a current picture including the current block.

9. The video decoding method of claim 1, wherein the weighted sum of the first prediction block and the second prediction block is determined by a weight determined based on weight information generated by parsing a bitstream.

10. A video encoding method comprising:

determining a first base motion vector of a current block for a first reference picture and a second base motion vector of the current block for a second reference picture;

determining a first motion vector difference in response to a first distance between a current picture including the current block and the first reference picture and a second distance between the current picture and the second reference picture being different, without parsing information regarding motion vector differences from a bitstream, wherein an absolute value of the first motion vector difference is limited within a predetermined range;

determining a second motion vector difference based on the first motion vector difference;

determining a first refinement motion vector by refining the first base motion vector by the first motion vector difference and a second refinement motion vector by refining the second base motion vector by the second motion vector difference;

determining first and second prediction blocks of the current block based on the first refinement motion vector and the second refinement motion vector; and determining a final prediction block for the current block based on a weighted sum of the first prediction block and the second prediction block, wherein the first motion vector difference is selected, based on a distortion between the first and second prediction blocks, obtained using the first motion vector difference being minimal, and wherein a first weight applied to the first prediction block and a second weight applied to the second prediction block are derived based on a result of a template matching among a first template corresponding to the first refinement motion vector, a second template corresponding to the second refinement motion vector, and a current template of the current block.

11. A method of transmitting a bitstream generated by a video encoding method, the method comprising:

encoding an image based on the video encoding method; and transmitting a bitstream including the encoded image, wherein the video encoding method comprises:

determining a first base motion vector of a current block for a first reference picture and a second base motion vector of the current block for a second reference picture;

determining a first motion vector difference in response to a first distance between a current picture including the current block and the first reference picture and a second distance between the current picture and the second reference picture being different, without parsing information regarding motion vector differences from a bitstream, wherein an absolute value of the first motion vector difference is limited within a predetermined range;

determining a second motion vector difference based on the first motion vector difference;

determining a first refinement motion vector by refining the first base motion vector by the first motion vector difference and determining a second refinement motion vector by refining the second base motion vector by the second motion vector difference;

determining first and second prediction blocks of the current block based on the first refinement motion vector and the second refinement motion vector; and determining a final prediction block for the current block based on a weighted sum of the first prediction block and the second prediction block, wherein the first motion vector difference is selected, based on a distortion between the first and second prediction blocks, obtained using the first motion vector difference being minimal, and wherein a first weight applied to the first prediction block and a second weight applied to the second prediction block are derived based on a result of a template matching among a first template corresponding to the first refinement motion vector, a second template corresponding to the second refinement motion vector, and a current template of the current block.

* * * * *